US012634712B2

(12) United States Patent
Lee et al.

(10) Patent No.: US 12,634,712 B2
(45) Date of Patent: May 19, 2026

(54) APPARATUS AND METHOD FOR DATA COMMUNICATION BASED ON INTELLIGENT REFLECTING SURFACE IN WIRELESS COMMUNICATION SYSTEM

(71) Applicants: Samsung Electronics Co., Ltd., Gyeonggi-do (KR); Seoul National University R&DB Foundation, Seoul (KR)

(72) Inventors: Seunghyun Lee, Gyeonggi-do (KR); Byonghyo Shim, Seoul (KR); Seungnyun Kim, Seoul (KR); Hyunsoo Kim, Seoul (KR); Yosub Park, Gyeonggi-do (KR)

(73) Assignees: Samsung Electronics Co., Ltd (KR); Seoul National University R&DB Foundation (KR)

( * ) Notice: Subject to any disclaimer, the term of this patent is extended or adjusted under 35 U.S.C. 154(b) by 786 days.

(21) Appl. No.: 17/955,039

(22) Filed: Sep. 28, 2022

(65) Prior Publication Data

US 2023/0097583 A1     Mar. 30, 2023

(30) Foreign Application Priority Data

Sep. 28, 2021     (KR) ........................ 10-2021-0128339

(51) Int. Cl.
*H04W 16/28* (2009.01)
*H04W 56/00* (2009.01)

(52) U.S. Cl.
CPC ......... *H04W 16/28* (2013.01); *H04W 56/001* (2013.01)

(58) Field of Classification Search
CPC ............... H04W 36/08; H04W 56/001; H04W 56/0015; H04W 56/0035; H04W 72/51; H04W 84/047
See application file for complete search history.

(56) References Cited

U.S. PATENT DOCUMENTS

| | | | |
|---|---|---|---|
| 2021/0126359 A1 | 4/2021 | Kim et al. | |
| 2022/0322321 A1* | 10/2022 | Dai ........................ | H04W 72/51 |
| 2023/0086052 A1* | 3/2023 | Nam ................... | H04W 84/047 370/315 |
| 2023/0246674 A1* | 8/2023 | Åström .............. | H04B 7/04013 375/262 |
| 2024/0072849 A1* | 2/2024 | Haija ................. | H04B 7/06952 |
| 2024/0107423 A1* | 3/2024 | Ly ......................... | H04W 36/08 |
| 2024/0356585 A1* | 10/2024 | Ly ......................... | H04L 5/0051 |

FOREIGN PATENT DOCUMENTS

KR          10-2192234          12/2020

OTHER PUBLICATIONS

Hyunsoo Kim et al., Deep Learning-Based Intelligent Reflecting Surface Phase Shift Control, 2021, 5 pages.

* cited by examiner

*Primary Examiner* — Michael Thier
*Assistant Examiner* — Prince A Mensah
(74) *Attorney, Agent, or Firm* — The Farrell Law Firm, P.C.

(57)          ABSTRACT
The disclosure relates to a 5G or a 6th generation (6G) communication system for supporting a higher data transmission rate after a 4th generation (4G) communication system such as LTE. An operating method of a BS in a wireless communication system includes broadcasting a power signal of an IRS, broadcasting an SSB, and requesting receive beam reporting from a control unit of the IRS.

12 Claims, 33 Drawing Sheets

START

TRANSMIT FIRST DCI ⟿1801

TRANSMIT REFLECTING ELEMENT OFF MODE SWITCH SIGNAL ⟿1803

RECEIVE FIRST SRS ⟿1805

ESTIMATE DIRECT CHANNEL ⟿1807

TRANSMIT IRS REFLECTING ELEMENT ON MODE SWITCH SIGNAL ⟿1809

TRANSMIT BEAM TRACKING CONTROL SIGNAL FOR IRS CHANNEL ESTIMATION AND SECOND DCI ⟿1811

RECEIVE SECOND SRS ⟿1813

ESTIMATE IRS-UE ANGLE INFORMATION ⟿1815

END

APPARATUS AND METHOD FOR DATA COMMUNICATION BASED ON INTELLIGENT REFLECTING SURFACE IN WIRELESS COMMUNICATION SYSTEM

CROSS-REFERENCE TO RELATED APPLICATION(S)

This application is based on and claims priority under 35 U.S.C. § 119 to Korean Patent Application No. 10-2021-0128339, which was filed in the Korean Intellectual Property Office on Sep. 28, 2021, the entire disclosure of which is incorporated herein by reference.

BACKGROUND

1. Field

The disclosure relates generally to a wireless communication system, and more particularly, to an apparatus and a method for data communication based on an intelligent reflecting surface (IRS) in the wireless communication system.

2. Description of Related Art

Considering the development of wireless communication from generation to generation, technologies have been developed mainly for services targeting humans, such as voice calls, multimedia services, and data services.

Following the commercialization of $5^{th}$ generation (5G) communication systems, however, it is expected that the number of connected devices will exponentially grow. Increasingly, these devices will be connected to communication networks. Examples of connected devices may include vehicles, robots, drones, home appliances, displays, smart sensors connected to various infrastructures, construction machines, and factory equipment.

Mobile devices are expected to evolve in various form-factors, such as augmented reality (AR) glasses, virtual reality (VR) headsets, and hologram devices. In order to provide various services by connecting hundreds of billions of devices and things, e.g., using Internet of things (IoT), in a $6^{th}$ generation (6G) era, there are ongoing efforts to develop improved 6G communication systems. 6G communication systems may also be referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the $\frac{1}{10}$ radio latency thereof.

In order to accomplish such a high data rate and an ultra-low latency, it has been proposed to implement 6G communication systems in a terahertz (THz) band (e.g., 95 gigahertz (GHz) to 3THz bands). It is expected that, due to severer path loss and atmospheric absorption in the THz bands than those in mmWave bands introduced in 5G, technologies capable of securing the signal transmission distance (i.e., coverage) will become more crucial. As such, it is important to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, there have been ongoing discussions on technologies for improving a coverage of THz-band signals, such as metamaterial-based lenses and antennas, orbital angular momentum (OAM), and reconfigurable intelligent surface (RIS).

In order to improve the spectral efficiency and the overall network performances, the following technologies have been developed for 6G communication systems:

- a full-duplex technology for allowing an uplink transmission and a downlink transmission to simultaneously use the same frequency resource at the same time;
- a network technology for utilizing satellites, high-altitude platform stations (HAPS), etc., in an integrated manner;
- an improved network structure for supporting mobile base stations (BSs) and the like and allowing network operation optimization and automation and the like;
- a dynamic spectrum sharing technology via collision avoidance based on a prediction of spectrum usage;
- a use of artificial intelligence (AI) in wireless communication for improving overall network operation by utilizing AI from a designing phase for developing 6G and internalizing end-to-end AI support functions; and
- a next-generation distributed computing technology for overcoming the limit of a user equipment (UE) computing ability through reachable super-high-performance communication and computing resources (such as mobile edge computing (MEC), clouds, etc.) over the network.

In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) and machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

As the number of smart phones and IoT devices and their required data amount rapidly increase, an IRS based communication is drawing great attention for improving network capacity. The IRS is a meta surface including hundreds or thousands of low-power reflecting elements, which may improve a signal quality of a terminal in a dead zone and coverage area by adding a new path (e.g., BS-IRS-terminal) of a high path gain to an existing path (e.g., BS-terminal).

SUMMARY

The disclosure has been made to address at least the above-mentioned problems and/or disadvantages and to provide at least the advantages described below.

An aspect of the disclosure is to provide an apparatus and a method for data communication based on an IRS in a wireless communication system.

Another aspect of the disclosure is to provide an apparatus and a method for a BS to initially accessing an IRS in a wireless communication system.

Another aspect of the disclosure is to provide an apparatus and a method for estimating an angle between a BS and an IRS in a wireless communication system.

Another aspect of the disclosure is to provide an apparatus and a method for a terminal to initially accessing a BS based on an IRS in a wireless communication system.

Another aspect of the disclosure is to provide an apparatus and a method for estimating an angle between an IRS and a terminal in a wireless communication system.

Another aspect of the disclosure is to provide an apparatus and a method for estimating path gains between an IRS and a terminal, and between a BS and the IRS in a wireless communication system.

Another aspect of the disclosure is to provide a deep learning-based phase shift control (D-PSC) architecture for maximizing a data rate based on deep learning.

In accordance with an aspect of the disclosure, a method performed a BS in a wireless communication system includes broadcasting a power signal of an IRS, broadcasting a synchronization signal block (SSB), and requesting receive beam reporting from a control unit of the IRS.

In accordance with another aspect of the disclosure, a method of an IRS in a wireless communication system includes turning on every reflecting element of the IRS in response to a power signal of the IRS received from a BS, obtaining cell information and performing synchronization in response to an SSB received from the BS, transmitting an SSB beam index to the BS, and transmitting a receive beam index to the BS in response to a receive beam reporting request from the BS.

In accordance with another aspect of the disclosure, a method of a UE in a wireless communication system includes, if not receiving an SSB from a BS, transmitting an initial access request signal to an IRS, obtaining cell information and performing synchronization based on a BS SSB beam reflected by the IRS, and transmitting an SSB beam index to the BS.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
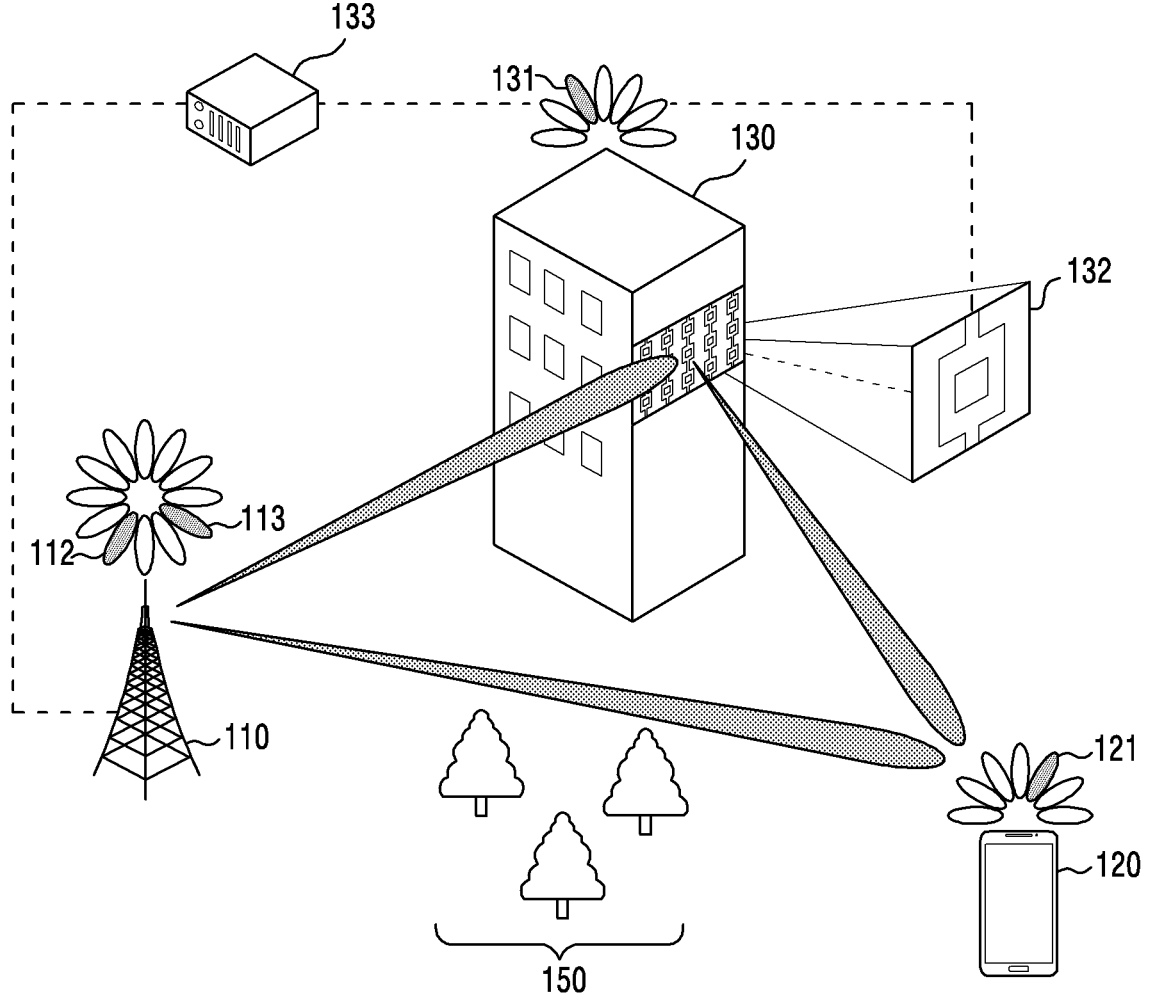
FIG. 1 illustrates a wireless communication system according to an embodiment.

Hereinafter, various embodiments will be described in detail with reference to attached drawings. In the disclosure, embodiments are described in the drawings and a related detailed description is set forth, but this is not intended to limit the embodiments of the disclosure. Descriptions of well-known functions and constructions are omitted for the sake of clarity and conciseness.

Terms used in the disclosure are used for describing particular embodiments, and may not intend to limit the scope of other embodiments. A singular expression may include a plural expression, unless they are definitely different in a context. All terms used herein, including technical and scientific terms, may have the same meaning as those commonly understood by a person skilled in the art of the disclosure. Terms defined in a generally used dictionary among the terms used in the disclosure may be interpreted to have the meanings equal or similar to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Embodiments of the disclosure to be described explain a hardware approach by way of example. However, since the embodiments of the disclosure include a technology using both hardware and software, embodiments of the disclosure do not exclude a software based approach.

Hereinafter, the disclosure relates to an apparatus and a method for data communication based on an IRS in a wireless communication system. Specifically, an apparatus and a method are provided for a BS to initially access an IRS in the wireless communication system, an apparatus and a method are provided for estimating an angle between the BS and the IRS, an apparatus and a method are provided for a UE to initially access the BS based on the IRS, an apparatus and a method are provided for estimating an angle between the IRS and the UE, and an apparatus and a method are provided for estimating path gains between the IRS and the UE, and between the BS and the IRS.

In the following descriptions, terms indicating signals, terms indicating channels, terms indicating control information, terms indicating network entities, terms indicating components of a device, etc., are illustrated for the convenience of description. Accordingly, the disclosure is not limited to terms to be described, and other terms having equivalent technical meanings may be used.

In addition, although embodiments are described herein using terms as set forth in a communication standard (e.g., 3rd generation partnership project (3GPP)), the embodiments of the disclosure may be easily modified and applied to other communication system.

FIG. 1 illustrates a wireless communication system according to an embodiment.

Referring to FIG. 1, the wireless communication system includes a BS 110, a UE 120, an IRS 130, and an obstacle 150. Although FIG. 1 illustrates only one BS, additional BSs, which are the same as or similar to the BS 110 may be further included.

The BS 110 is a network infrastructure that provides radio access to the UE 120 and the IRS 130. The BS 110 has coverage defined as a specific geographic region based on a signal transmission distance. The BS 110 may also be referred to as an access point (AP), an eNodeB (eNB), a 5G node, a wireless point, a transmission/reception point (TRP), or other term having a technically identical meaning.

The UE 120 is a device is used by a user, and communicates with the BS 110 over a radio channel. In some cases, the UE 120 may be operated without user's involvement. For example, the UE 120 may be a device that performs machine type communication (MTC), and is not carried by the user. The UE 120 may also be referred to as a terminal, a mobile station, a subscriber station, a remote terminal, a wireless terminal, a user device, or other term having a technically identical meaning.

The BS 110, the UE 120, and the IRS 130 may transmit and receive radio signals in a millimeter wave (mmWave) band (e.g., 28 GHz, 30 GHz, 38 GHz, and 60 GHz). To improve channel gain, the BS 110, the UE 120, and the IRS 130 may perform beamforming. The beamforming may include transmit beamforming and receive beamforming. That is, the BS 110, the UE 120, and the IRS 130 may give directivity to a transmit signal or a receive signal. The BS 110, the UE 120 and the IRS 130 may select serving beams 112, 113, 121, and 131 through a beam search or beam management. After the serving beams 112, 113, 121, and 131 are selected, communications may be performed through resources that are quasi co-located (QCL) with resources transmitting the serving beams 112, 113, 121, and 131.

If large-scale characteristics of a channel carrying a symbol on a first antenna port may be inferred from a channel carrying a symbol on a second antenna port, the first antenna port and the second antenna port may be estimated to be QCL. For example, the large-scale characteristics may include at least one of delay spread, Doppler spread, Doppler shift, average gain, average delay, and spatial receiver parameter.

The obstacle 150 may collectively indicate various elements (e.g., geographic features) interrupting with the communication.

Figure 2:
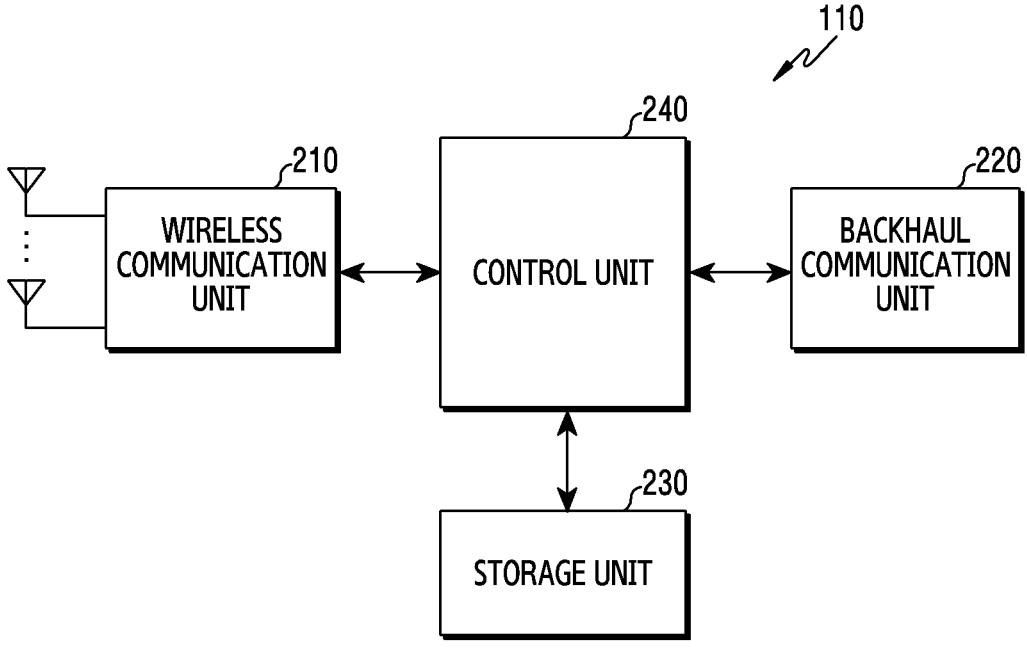
FIG. 2 illustrates a BS in a wireless communication system according to an embodiment.

FIG. 2 illustrates a BS in a wireless communication system according to an embodiment. For example, the configuration illustrated in FIG. 2 may be understood as the configuration of the BS 110. A term such as '~ unit' or '~er' used hereafter indicates a unit for processing at least one function or operation, and may be implemented using hardware, software, or a combination of hardware and software.

Referring to FIG. 2, the BS includes a communication unit 210, a backhaul communication unit 220, a storage unit 230, and a control unit 240.

The wireless communication unit 210 performs functions for transmitting and receiving a signal over a radio channel. For example, the wireless communication unit 210 performs a conversion function between a baseband signal and a bit string according to a physical layer standard of the system. In data transmission, the wireless communication unit 210 may generate complex symbols by encoding and modulating a transmit bit string. In data reception, the wireless communication unit 210 may restore a receive bit string by demodulating and decoding a baseband signal.

The wireless communication unit 210 up-converts the baseband signal into an RF band signal, transmits it via an antenna, and down-converts an RF band signal received via an antenna into a baseband signal. The wireless communication unit 210 may include a transmit filter, a receive filter, an amplifier, a mixer, an oscillator, a digital to analog convertor (DAC), an analog to digital convertor (ADC), etc. In addition, the wireless communication unit 210 may include a plurality of transmit and receive paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to an operating power, an operating frequency, etc. The digital unit may be implemented with at least one processor (e.g., a digital signal processor (DSP)).

The wireless communication unit 210 transmits and receives the signal as stated above. Hence, all or part of the wireless communication unit 210 may be referred to as 'a transmitter', 'a receiver', or 'a transceiver'. Also, in the following explanations, the transmission and the reception over the radio channel embraces the above-described processing of the wireless communication unit 210.

The backhaul communication unit 220 provides an interface for communicating with other nodes in the network. That is, the backhaul communication unit 220 converts a bit string transmitted from the BS to another node, e.g., another access node, another BS, an upper node, or a core network, into a physical signal, and converts a physical signal received from the other node into a bit string.

The storage unit 230 stores a basic program for operating the BS, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the BS. For example, the control unit 240 transmits and receives the signal through the wireless communication unit 210 or the backhaul communication unit 220. Also, the control unit 240 records and reads data in and from the storage unit 230. The control unit 240 may execute functions of a protocol stack requested by a communication standard. Alternatively, the protocol stack may be included in the wireless communication unit 210.

The control unit 240 may include at least one processor. The control unit 240 may be, as instruction sets or codes stored in the storage unit 230, instructions/codes at least temporarily residing in the control unit 230 or a storage space storing instructions/codes, or may be a part of circuitry constituting the control unit 230.

The control unit 240 may control the BS to carry out operations according to various embodiments as described below.

Figure 3:
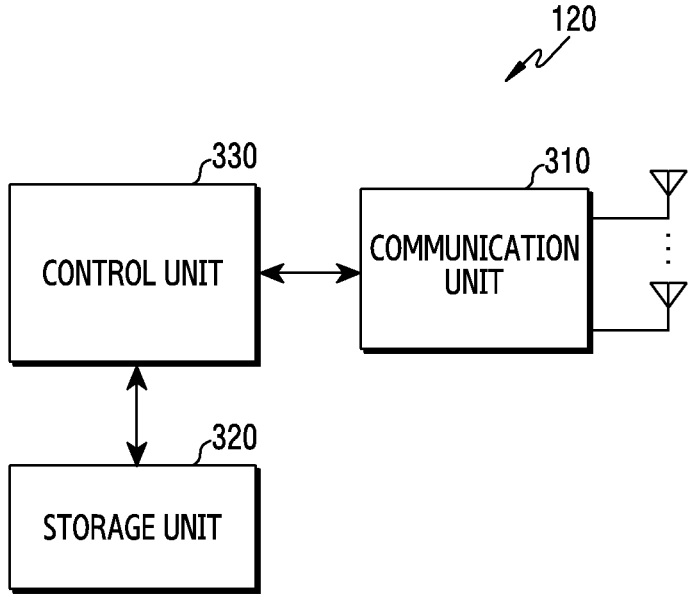
FIG. 3 illustrates a terminal in a wireless communication system according to an embodiment.

FIG. 3 illustrates a UE in a wireless communication system according to an embodiment. The configuration illustrated in FIG. 3 may be understood as the configuration of the UE 120.

Referring to FIG. 3, the UE includes a communication unit 310, a storage unit 320, and a control unit 330.

The communication unit 310 performs functions for transmitting and receiving a signal over a radio channel. For example, the communication unit 310 performs a conversion function between a baseband signal and a bit string according to the physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal into an RF band signal, transmits it via an antenna, and down-converts an RF band signal received via the antenna into a baseband signal. For example, the communication unit 310 may include a transmit filter, a receive filter, an amplifier, a mixer, an oscillator, a DAC, an ADC, etc.

The communication unit 310 may include a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 may include different communication modules to process signals of different frequency bands. Further, the communication unit 310 may include a plurality of communication modules to support a plurality of radio access technologies. For example, the different radio access technologies may include Bluetooth low energy (BLE), wireless fidelity (Wi-Fi), WiFi Gigabyte (WiGig), a cellular network (e.g., long term evolution (LTE)), etc. In addition, the different frequency bands may include a super high frequency (SHF) (e.g., 2.5 GHz, 5 Ghz) band, and the mmWave (e.g., 60 GHz) band.

The communication unit 310 transmits and receives the signals as described above. Hence, all or part of the communication unit 310 may be referred to as 'a transmitter', 'a receiver', or 'a transceiver'. In addition, the transmission and the reception over the radio channel embraces the above-described processing of the communication unit 310 in the following explanations.

The storage unit 320 stores a basic program for operating the UE, an application program, and data such as setting information. The storage unit 320 may include a volatile memory, a non-volatile memory, or a combination of a volatile memory and a non-volatile memory. The storage unit 320 provides the stored data at a request of the control unit 330.

The control unit 330 controls general operations of the UE. For example, the control unit 330 transmits and receives the signal through the communication unit 310. The control unit 330 records and reads data in and from the storage unit 320. The control unit 330 may execute functions of the protocol stack required by the communication standard. The control unit 330 may include at least one processor or microprocessor, or may be part of a processor.

In addition, part of the communication unit 310 and the control unit 330 may be referred to as a communication processor. According to embodiments, the control unit 330 may be, as instruction sets or codes stored in the storage unit 320, instructions/codes at least temporarily residing in the control unit 330 or a storage space storing instructions/codes, or may be a part of circuitry constituting the control unit 330.

The control unit 330 may control the UE to carry out operations according to various embodiments as described below.

Figure 4:
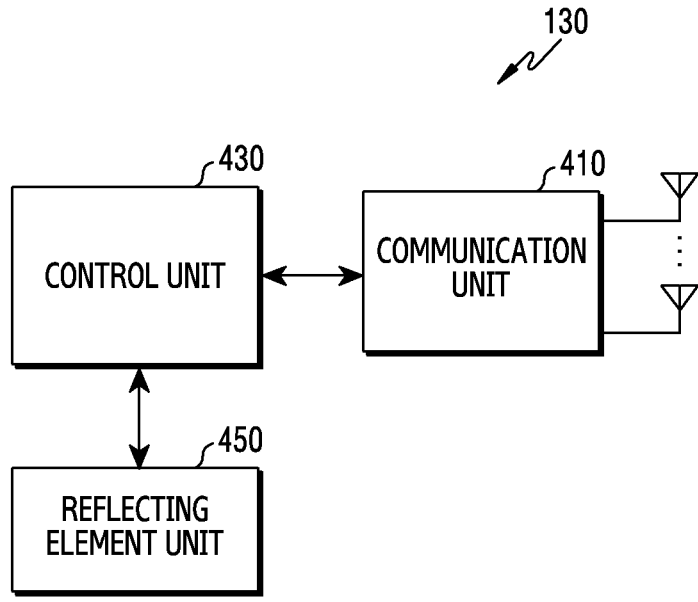
FIG. 4 illustrates an IRS in a wireless communication system according to an embodiment.

FIG. 4 illustrates an IRS in a wireless communication system according to an embodiment. The configuration illustrated in FIG. 4 may be understood as the configuration of the IRS 130.

Referring to FIG. 4, the IRS includes a communication unit 410, a control unit 430, and a reflecting element unit 450.

The communication unit 410 performs functions for transmitting and receiving a signal over a radio channel. For example, the communication unit 410 performs a conversion function between a baseband signal and a bit string according to the physical layer standard of the system. In data transmission, the communication unit 410 generates complex symbols by encoding and modulating a transmit bit string. In data reception, the communication unit 410 restores a receive bit string by demodulating and decoding a baseband signal. Also, the communication unit 410 up-converts the baseband signal into an RF band signal, transmits it via an antenna, and down-converts an RF band signal received via the antenna to a baseband signal. For example, the communication unit 410 may include a transmit filter, a receive filter, an amplifier, a mixer, an oscillator, a DAC, an ADC, etc.

The communication unit 410 may include a plurality of transmit and receive paths. The communication unit 410 may include at least one antenna array including a plurality of antenna elements. In terms of hardware, the communication unit 410 may include a digital circuit and an analog circuit (e.g., an RFIC). Herein, the digital circuit and the analog circuit may be implemented as a single package. Also, the communication unit 410 may include a plurality of RF chains. Further, the communication unit 310 may perform the beamforming.

The communication unit 410 may include different communication modules to process signals of different frequency bands. Further, the communication unit 410 may include a plurality of communication modules to support a plurality of radio access technologies. For example, the different radio access technologies may include BLE, Wi-Fi, WiGig, a cellular network (e.g., LTE), etc. In addition, the different frequency bands may include the SHF (e.g., 2.5 GHz, 5 Ghz) band, and the mmWave (e.g., 60 GHz) band.

The communication unit 410 transmits and receives the signals as described above. Hence, all or part of the communication unit 410 may be referred to as 'a transmitter', 'a receiver', or 'a transceiver'. In addition, the transmission and the reception over the radio channel embraces the above-described processing of the communication unit 410 in the following explanations.

The control unit 430 controls general operations of the IRS 430. For example, the control unit 430 transmits and receives the signal through the communication unit 410. The control unit 430 may execute functions of the protocol stack required by the communication standard. The control unit 430 may include at least one processor or microprocessor, or may be part of a processor. In addition, part of the communication unit 410 and the control unit 430 may be referred to as a communication processor.

The control unit 430 may be connected to the IRS 430 by wire or by radio.

The control unit 430 may control the IRS to carry out operations according to embodiments to be described.

The reflecting element unit 450 may indicate a set of a plurality of reflecting elements, which constitutes the IRS 130. Each reflecting element of the reflecting element unit 450 may be controlled by the control unit 430. That is, each reflecting element may reflect an incident signal with a signal having intended phase shift by the control unit 430. Thus, by reflecting the incident signal with the intended phase, the reflecting element unit 450 may modify the radio channel and considerably improve a capacity of the communication system.

Figure 5A:
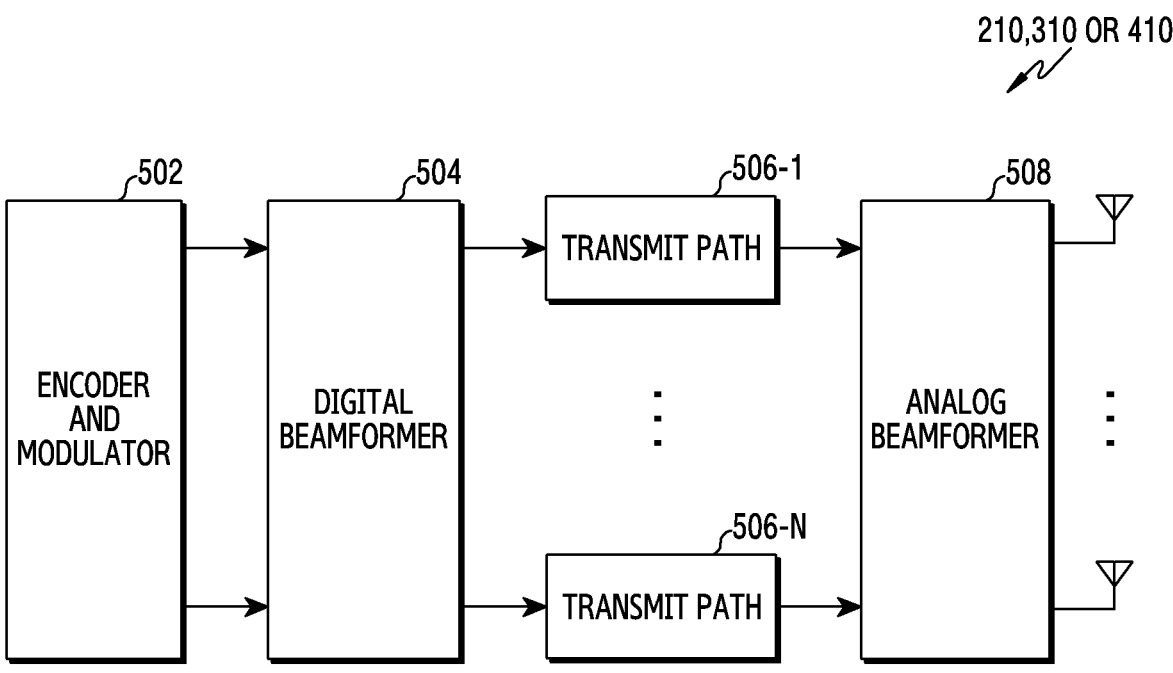
FIG. 5A illustrates a communication unit in a wireless communication system according to an embodiment.
Figure 5B:
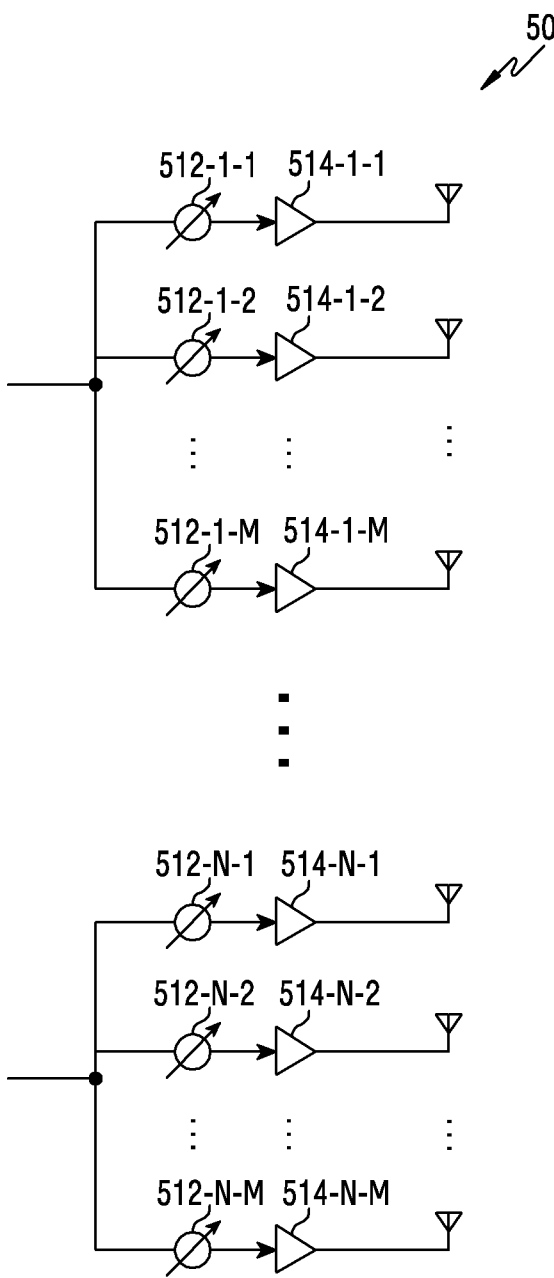
FIG. 5B illustrates a communication unit in a wireless communication system according to an embodiment.
Figure 5C:
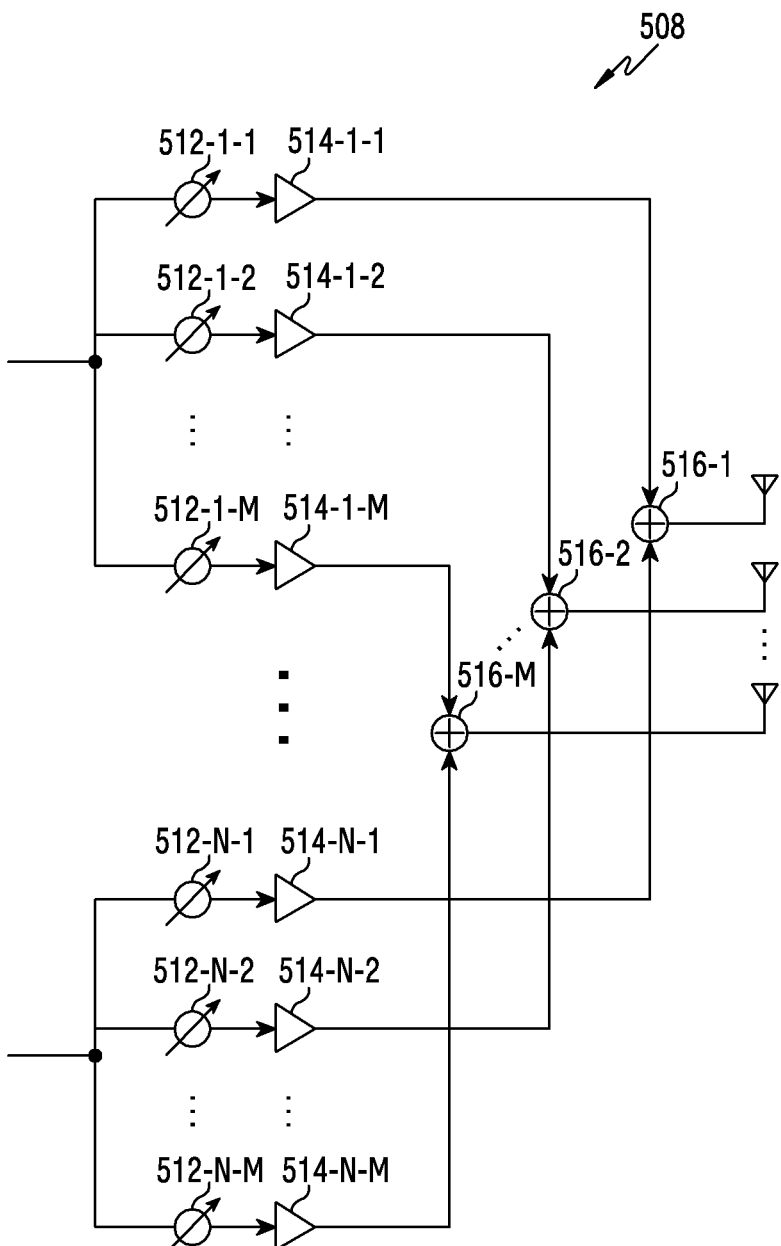
FIG. 5C illustrates a communication unit in a wireless communication system according to an embodiment.

FIGS. 5A, 5B, and 5C illustrate a communication unit in a wireless communication system according to an embodiment. For example, FIGS. 5A, 5B, and 5C illustrate examples of a configuration of the wireless communication unit 210 of FIG. 2, the communication unit 310 of FIG. 3, or the communication unit 410 of FIG. 4. As such, FIGS. 5A, 5B, and 5C illustrate components for performing beamforming, as a part of the wireless communication unit 210 of FIG. 2, the communication unit 310 of FIG. 3, or the communication unit 410 of FIG. 4.

Referring to FIG. 5A, the communication unit includes an encoder and modulator 502, a digital beamformer 504, a plurality of transmit paths 506-1 through 506-N, and an analog beamformer 508.

The encoder and modulator 502 performs channel encoding. For the channel encoding, at least one of a low density parity check (LDPC) code, convolution code, or polar code may be used. The encoder and modulator 502 generates modulation symbols by performing constellation mapping.

The digital beamformer 504 beamforms a digital signal (e.g., the modulation symbols). The digital beamformer 504 multiplies the modulation symbols by beamforming weights. Herein, the beamforming weights may be used to change amplitude and phase of the signal, and may be referred to as a 'precoding matrix', a 'precoder', etc.

The digital beamformer 504 outputs the digital-beamformed modulation symbols to the plurality of the transmit paths 506-1 through 506-N. In so doing, according to a MIMO transmission scheme, the modulation symbols may be multiplexed, or the same modulation symbols may be provided to the plurality of the transmit paths 506-1 through 506-N.

The transmit paths 506-1 through 506-N convert the digital-beamformed digital signals into analog signals. Each of the transmit paths 506-1 through 506-N may include an inverse fast Fourier transform (IFFT) operator, a cyclic prefix (CP) adder, a DAC, and an up-converter. The CP adder is for an OFDM scheme, and may be excluded if other physical layer scheme (e.g., filter bank multi-carrier (FBMC)) is applied. That is, the transmit paths 506-1 through 506-N provide independent signal processes for a plurality of streams generated through the digital beamforming. Depending on the implementation, some of the components of the transmit paths 506-1 through 506-N may be used in common.

The analog beamformer 508 beamforms the analog signals. The digital beamformer 504 multiplies the analog signals by the beamforming weights. Herein, the beamforming weights are used to change the amplitude and the phase of the signal. Specifically, the analog beamformer 508 may be configured variously, according to a connection structure between the transmit paths 506-1 through 506-N and antennas.

Referring to FIG. 5B, signals input to the analog beamformer 508 are converted in phase/amplitude, amplified, and transmitted via the antennas. The signal of each path is transmitted via different antenna sets, i.e., antenna arrays. A signal input in a first path is converted by phase/amplitude converters 512-1-1 through 512-1-M into a signal string having different or identical phase/amplitude, amplified by the amplifiers 514-1-1 through 514-1-M, and then transmitted via the antennas.

Referring to FIG. 5C, signals input to the analog beamformer 508 are converted in phase/amplitude, amplified, and transmitted via antennas. The signal of each path is transmitted via the same antenna set, i.e., the same antenna array. The signal input in the first path is converted by the phase/magnitude converters 512-1-1 through 512-1-M to the signal string having different or identical phase/amplitude, and amplified by the amplifiers 514-1-1 through 514-1-M. To transmit via a single antenna array, the amplified signals are summed by adders 516-1-1 through 516-1-M based on the antenna element, and then transmitted via the antennas.

FIG. 5B illustrates the example of using the independent antenna array per transmit path, and FIG. 5C illustrates the example in which the transmit paths share the single antenna array. However, according to another embodiment, some transmit paths may use the independent antenna array, and the remaining transmit paths may share one antenna array. According to yet another embodiment, by applying a switchable structure between the transmit paths and the antenna arrays, a structure which adaptively changes according to a situation may be used.

In accordance with an aspect of the disclosure, signaling methods are provided for initial access, channel estimation, and data communication based on the IRS 130.

Recently, with rapid increase in the number of smart phones and IoT devices and data demands, IRS based communication is attracting great attention as a way for improving a network capacity. The IRS 130 is a meta surface including hundreds or thousands of low-power reflecting elements, and may significantly improve signal quality of a UE in a dead zone and coverage area by adding a new path (e.g., BS-IRS-UE) of a high path gain to an existing path (e.g., BS-UE).

More specifically, the BS 110 may transmit a reflection coefficient of the reflecting element to the IRS via a BS-IRS radio link, and the control unit 430 of the IRS 130 may adjust the reflection coefficient of the reflecting element based on the received reflection coefficient. Hence, the IRS 130 may change a reflection pattern of the incident signal and thus considerably improve the signal quality by mitigating interference with the UE 120 and concurrently increasing a received signal strength.

The IRS channel information may be estimated in order to obtain the IRS reflection coefficient for maximizing the network capacity. Provided that the numbers of antennas of the UE 120 and the BS 110 are M and l respectively and the number of the reflection elements of the IRS is N, the IRS based network includes a direct channel $h_d \in \mathbb{C}^M$ between the BS 110 and the UE 120, a channel $G \in \mathbb{C}^{M \times N}$ between the BS 110 and the IRS 130, and a channel $h_r \in \mathbb{C}^N$ between the IRS 130 and the UE 120.

An effective channel $\tilde{h}$ between the BS 110 and the UE 120 may be expressed as shown in Equation (1).

$$\tilde{h} = G\text{diag}((\phi)h_r = h_d + H\phi \tag{1}$$

In Equation (1), $\phi \in \mathbb{C}^N$ denotes a reflection coefficient vector of the IRS, and $H = G\text{diag}(h_r)$ denotes a combined channel between the BS 110, the IRS 130 and the UE 120. That is, the direct channel $h_d$ and the combined channel H are obtained through the channel estimation in order to acquire the reflection coefficient vector $\phi$ which maximizes the network capacity.

Herein, the combined channel H may be decomposed to a multipath function using sparsity of the mmWave. The combined channel H includes the channel G between the BS 110 and the IRS 130 and the channel $h_r$ between the IRS 130 and the UE 120, the BS 110 and the IRS 130 are installed at positions with line of sight (LoS) and accordingly the LoS component is dominant in G, whereas LoS and non-LoS components coexist in $h_r$. Thus, the channel G between the BS 110 and the IRS 130 in the mmWave may be expressed as shown in Equation (2).

$$G = \gamma a_B(\theta) a_I^H(\varphi) \tag{2}$$

In Equation (2), $\gamma$ denotes a path gain, and $\theta$, $\varphi$, $a_B(\theta) = [1, e^{j2\pi d_B/\lambda \ sin\theta}, \ldots , e^{j(M-1)2\pi d_B/\lambda \ sin\theta}]^T$, and $a_I(\varphi) = [1, e^{j2\pi d_I/\lambda \ sin\theta}, \ldots , e^{j(N-1)2\pi d_I/\lambda \ sin\theta}]^T$ denote an angle of departure (AoD), an angle of arrival (AoA), a BS direction vector, and an IRS direction vector between the BS 110 and the IRS 130, respectively. $d_B$ and $d_I$ denote BS and IRS antenna spacings, and A denotes a propagation signal wavelength.

In addition, the channel $h_r$ between the IRS 130 and the UE 120 may be expressed as shown in Equation (3).

$$h_r = \alpha a_I(\Psi) \tag{3}$$

In Equation (3), $\Psi$ is an AoD between the BS 110 and the UE 120, a is a path gain of the multipath, and $a_I$ is a directional vector. The combined channel H may be expressed as a multipath function of Equation (4) using an mmWave channel model.

$$H = G\text{diag}(h_r) = \alpha\gamma a_B(\theta)(a_I(\psi) \odot a_I^*(\varphi))^H \tag{4}$$

In Equation (4), $\odot$, O*, and $O^H$ are an element-wise product, a complex function, and an Hermite function respectively. That is, the combined channel H is expressed with the function of BS-IRS angle information ($\theta$, $\varphi$), IRS-UE angle information $\psi$, and BS-IRS and IRS-UE path gain information ($\gamma$, $\alpha$). Hence, the IRS channel information may be estimated with less pilots by estimating the multipath component instead of the entire channel matrix.

In addition, the BS-IRS angle information ($\theta$, $\varphi$), the IRS-UE angle information $\psi$, and the BS-IRS and IRS-UE path gain information ($\gamma$, $\alpha$) are different from each other in a coherent time. The angle information generally has a longer coherent time than the path gain information by 10~40 times, the locations of the BS 110 and the IRS 130 do not change compared to the time-varying location of the UE 120, and accordingly the BS-IRS channel is longer than the IRS-UE channel in the coherent time. Based on such physical features, the combined channel H may be expressed with the function of the static BS-IRS angle information (θ, φ), the semi-static IRS-UE angle information ψ, and the time-varying BS-IRS and IRS-UE path gain information (γ, α).

An on/off channel estimation scheme and a grouping based channel estimation scheme have been suggested as conventional network channel estimation schemes based on the IRS 130. First, the on/off channel estimation scheme uses IRS characteristics of turning on the reflecting element (the magnitude of the reflection coefficient is 1) and turning off the reflecting element (the magnitude of the reflection coefficient is 0).

In the on/off channel estimation scheme, the BS sequentially turns on only one reflecting element and turning off all the other reflecting elements, and estimates the channel information corresponding to the reflecting element by using an uplink pilot transmitted by the UE. The channel information of one reflecting element may be estimated in each slot, and the whole IRS channel may be estimated by iterating the on/off switching as many as the whole reflecting elements.

Since the on/off channel estimation scheme sequentially turns on and off all of the reflecting elements, considerable pilot symbols are required in proportion to the number of the reflecting elements. The number of available pilots is limited depending on the coherent time, and accordingly it is not possible to use the on/off scheme in using considerable reflecting elements. For example, in the IRS 130 having 256 reflecting elements, the reflecting elements are greater in number than 84 resource elements of a resource block of the LTE, and accordingly the whole IRS channel information may not be estimated with the on/off scheme. In addition, the data rate is abruptly lowered because data transmission is infeasible due to uplink pilots for the channel estimation.

Second, the grouping based channel estimation scheme groups several reflecting elements for the same phase shift and estimates the channel per group. The on/off channel estimation scheme estimates the channel information of one reflecting element in each slot, whereas the grouping based channel estimation scheme estimates the channel information of one reflecting element group and thus reduces the pilot amount as many as the reflecting elements of one group. For example, if four reflecting elements are grouped as one group, the number of the groups is N/4 and the required pilot amount is reduced to ¼ compared to the related art.

However, the grouping based channel estimation scheme decreases accuracy of the channel estimation in inverse proportion to the number of the reflecting elements of one group. Specifically, since every reflecting element of one group has the same phase shift value, the estimated channel information of the group is equal to an average of the channel information of the reflecting elements. Thus, the data rate is degraded because the grouping based channel estimation scheme is subject to a considerable channel estimation error when compared to the on/off channel estimation scheme.

To address such problems, in accordance with an aspect of the disclosure, signaling methods are provided for efficient initial access, channel estimation, and data communication by using the sparse propagation characteristics of the mmWave and the coherent time difference between the channel elements.

Hereafter, it is noted that operations performed by the IRS 130 may also be carried out by the control unit 403 of an IRS, e.g., as illustrated in FIG. 4.

Figure 6:
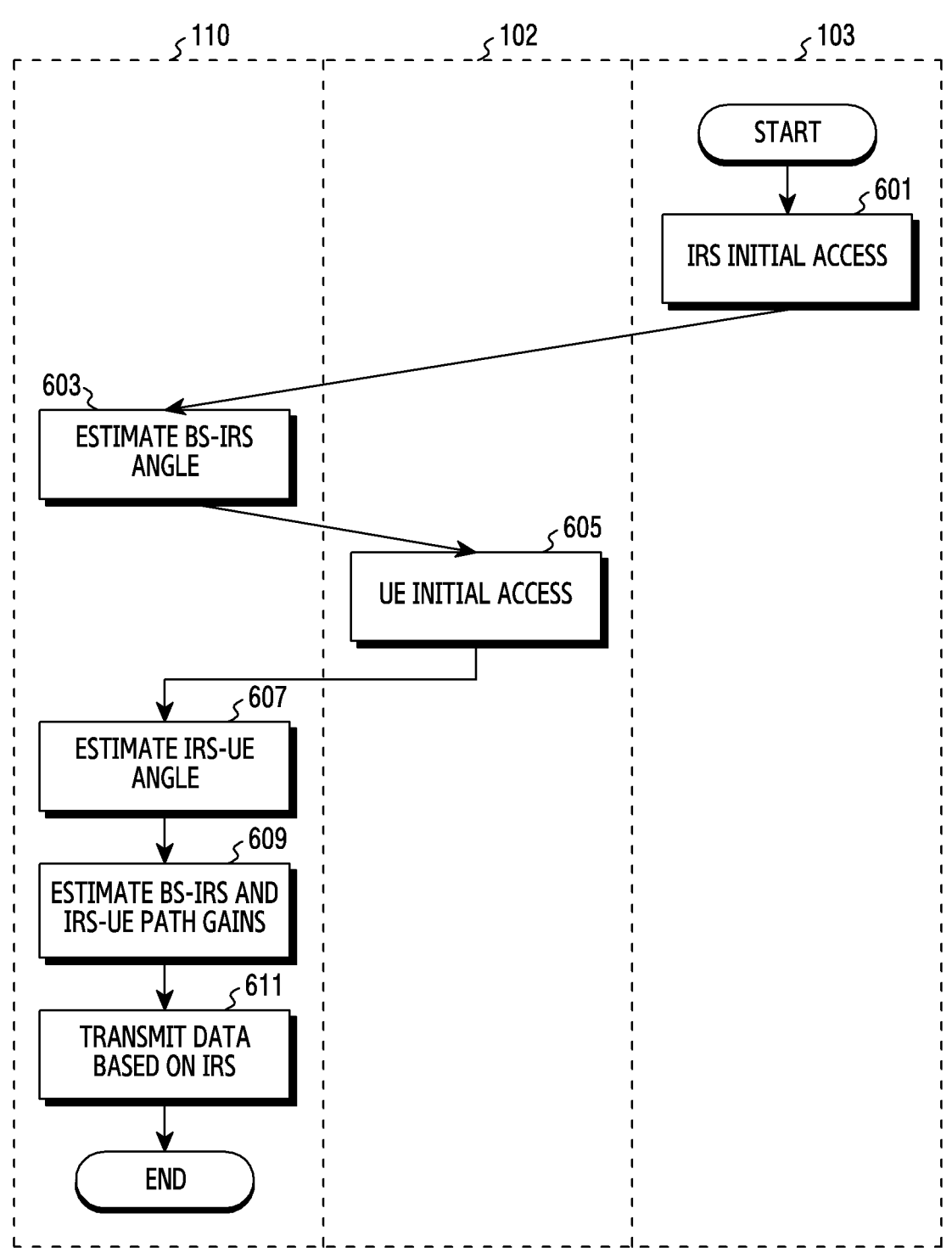
FIG. 6 is a flowchart illustrating data communication using an IRS in a wireless communication system according to an embodiment.

FIG. 6 is a flowchart illustrating data communication using an IRS in a wireless communication system according to an embodiment.

Referring to FIG. 6, in step 601, the IRS 130 initially accesses a BS 110. Specific operations of step 601 shall be described below with reference to FIGS. 8 and 9. Notably, processes illustrated in FIGS. 8 and 9 may be omitted if the BS 110 and the IRS 130 or the control unit 430 of the IRS 1230 are connected over a wired network.

Figure 11:
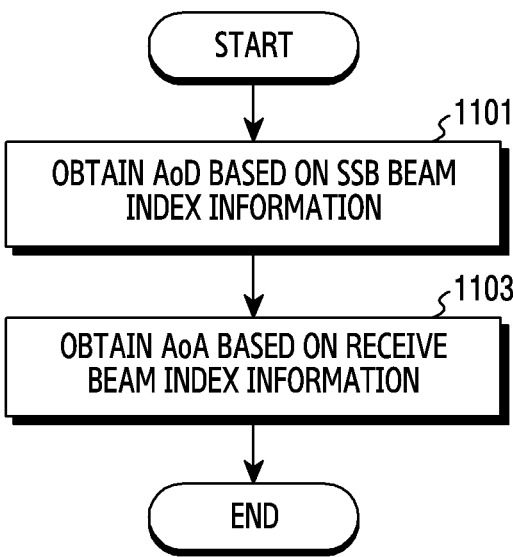
FIG. 11 is a flowchart illustrating a method of a BS for estimating an angle between the BS and an IRS in a wireless communication system according to an embodiment.
Figure 12:
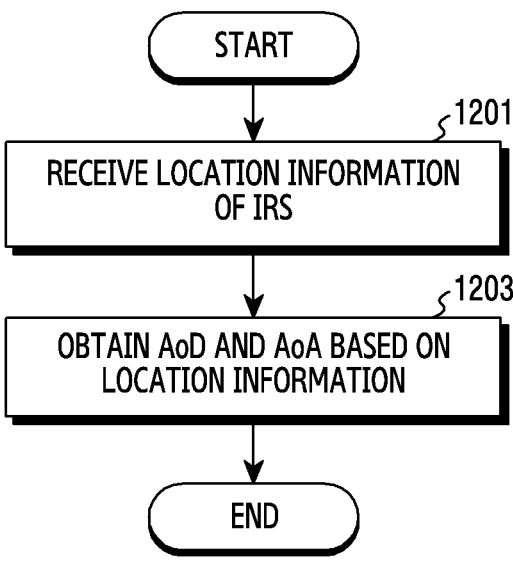
FIG. 12 is a flowchart illustrating a method of a BS for estimating an angle between the BS and an IRS in a wireless communication system according to an embodiment.

In step 603, the BS 110 estimates an angle between the BS 110 and the IRS 130. Specific operations of step 603 shall be described below with reference to FIGS. 11 and 12. Notably, FIG. 11 illustrates that the BS 110 and the control unit 430 of the IRS 130 are connected by radio, and FIG. 12 illustrates that the BS 110 and the control unit 430 of the IRS 130 are connected by cable.

In step 605, the UE 120 initially accesses the BS 110. In this case, the initial access may differ, if the UE 120 is or is not in the dead zone. Specific operations of step 605 are described below with reference to the UE 120 in FIG. 13, the IRS 130 in FIG. 14, and the BS 110 in FIG. 15. Additionally, FIG. 16 illustrates signal exchange between the UE 120, the IRS 130, and the BS 110.

Figure 21:
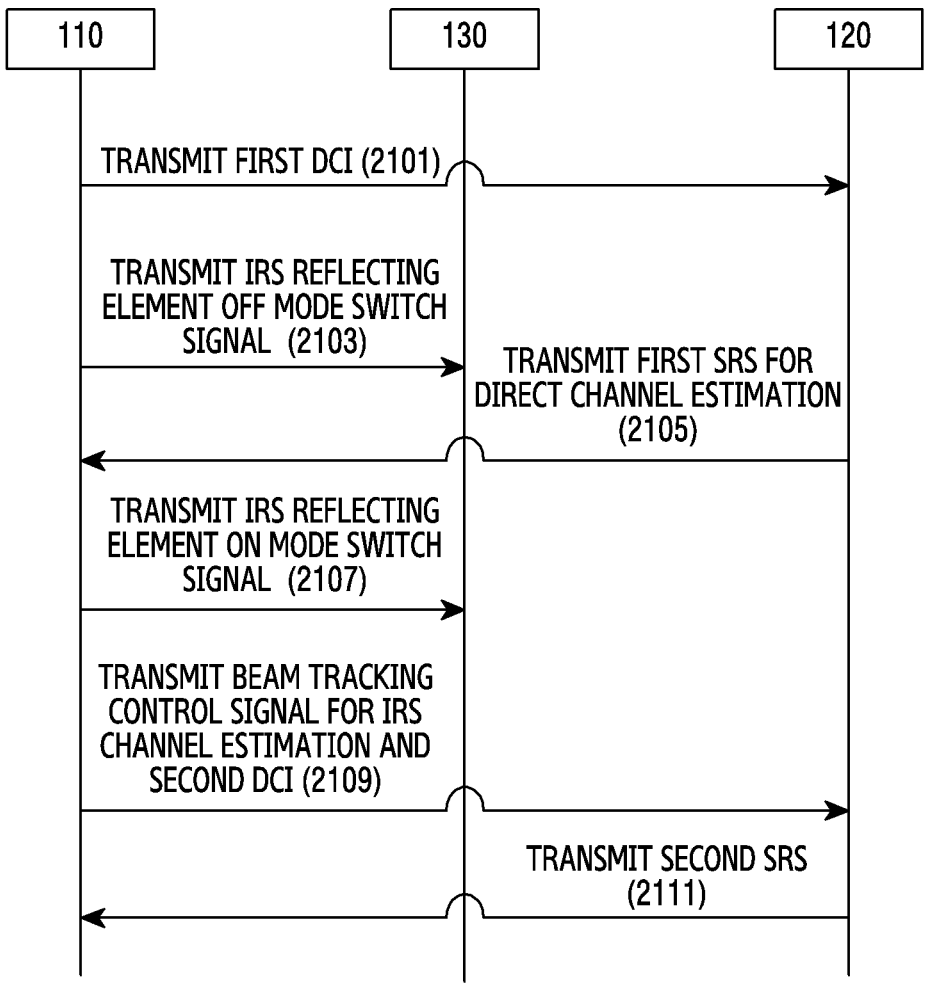
FIG. 21 is a signal flow diagram illustrating signal exchange between a BS, an IRS, or a terminal for angle estimation between the IRS and the terminal in a wireless communication system, according to an embodiment.
Figure 22:
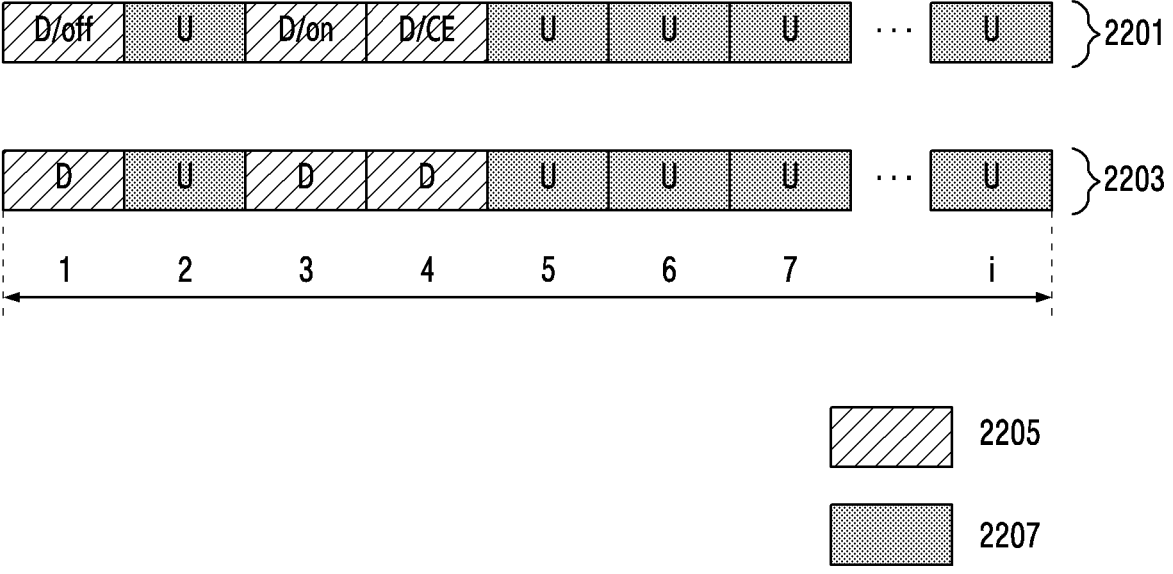
FIG. 22 illustrates a slot configuration diagram for angle estimation between an IRS and a terminal in a wireless communication system, according to an embodiment.

In step 607, the BS 110 estimates an angle between the UE 120 and the IRS 130. Specific operations of step 607 are described below with reference to the BS 110 in FIG. 17 and FIG. 18, the IRS 130 in FIG. 19, and the UE 120 in FIG. 20. Additionally, FIG. 21 illustrates signal exchange between the UE 120, the IRS 130, and the BS 110, and FIG. 22 illustrates a slot configuration for angle estimation.

Figure 26:
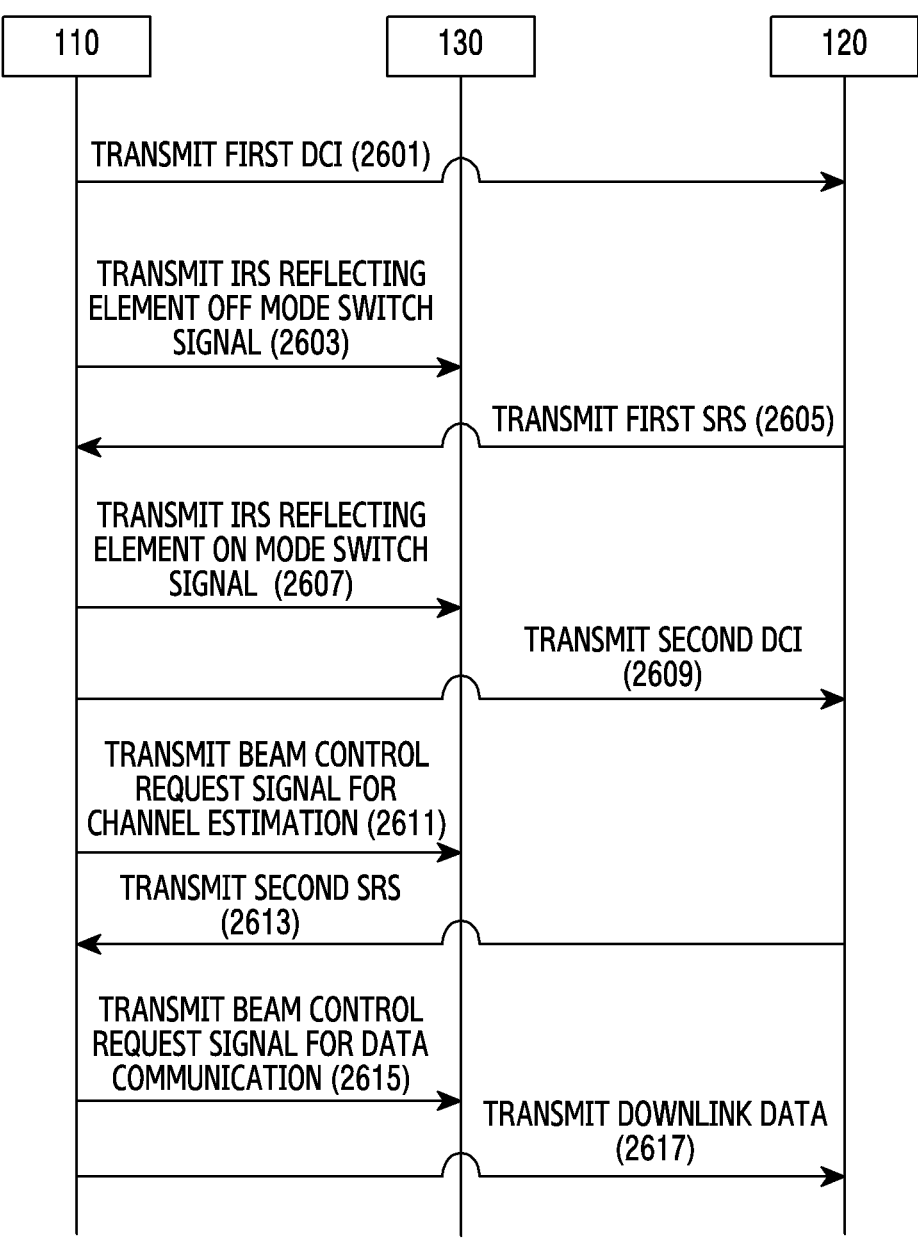
FIG. 26 is a signal flow diagram illustrating signal exchange between a BS, an IRS, or a terminal for path gain estimation between the IRS and the terminal and path gain estimation between the IRS and the BS in a wireless communication system, according to an embodiment.
Figure 27:
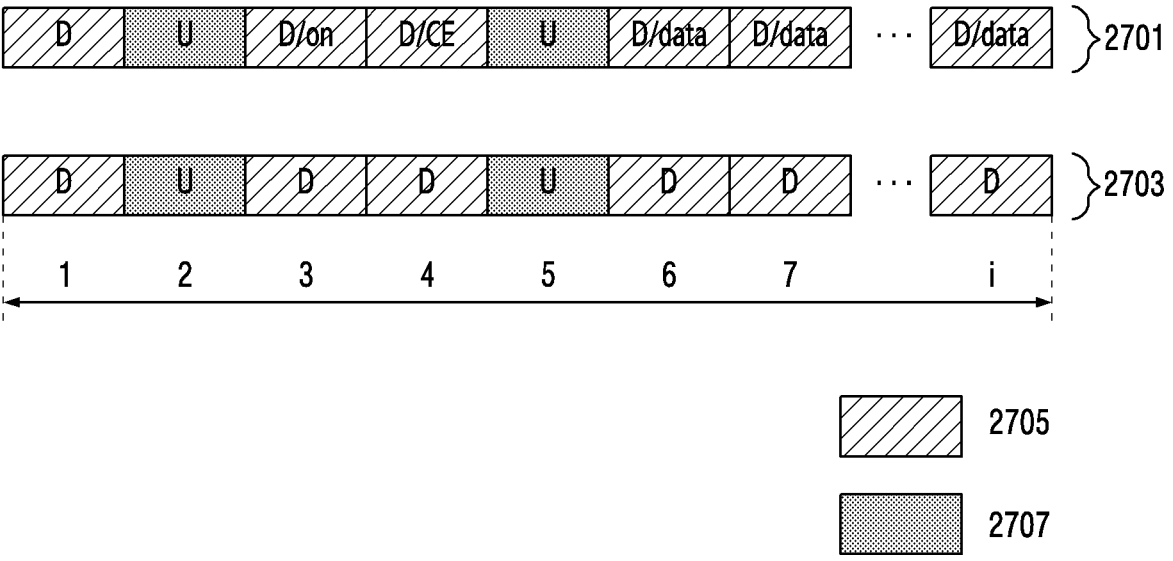
FIG. 27 illustrates a slot configuration diagram for path gain estimation between an IRS and a terminal and path gain estimation between the IRS and a BS in a wireless communication system, according to an embodiment.

In step 609, the BS 110 estimates path gains between the BS 110 and the IRS 130, and between the IRS 130 and the UE 120. Specific operations of step 609 are described below with reference to the BS 110 in FIG. 23, the IRS 130 in FIG. 24, and the UE 120 in FIG. 25. Additionally, FIG. 26 illustrates signal exchange between the UE 120, the IRS 130, and the BS 110, and FIG. 27 illustrates a slot configuration for the path gain estimation.

In step 611, the BS 110 transmits data to the UE 120 based on the angle estimation and the path gain. Specific experiment data of step 611 described below with reference to FIG. 28.

Figure 7:
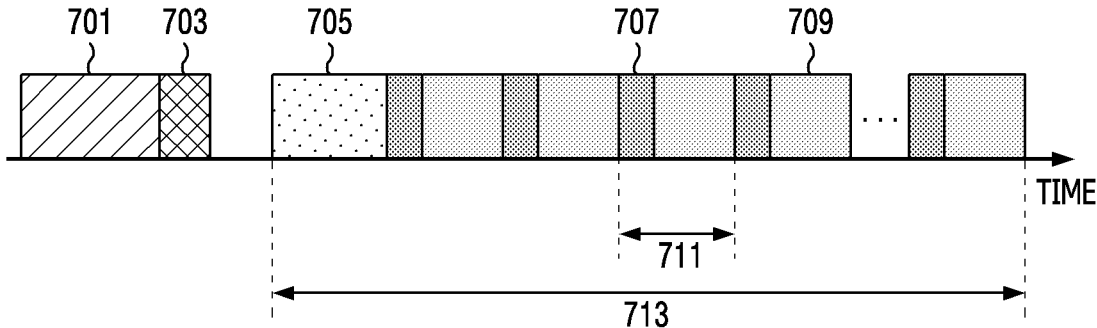
FIG. 7 illustrates data communication using an IRS in a wireless communication system according to an embodiment.

FIG. 7 illustrates data communications using an IRS in a wireless communication system according to an embodiment. Specifically, FIG. 7 illustrates time flow from left to right.

Referring to FIG. 7, data 701 corresponds to step 601 of FIG. 6, data 703 corresponds to step 603 of FIG. 6, data 705 corresponds to step 605 of FIG. 6, data 707 corresponds to step 607 of FIG. 6, and data 709 corresponds to step 609 of FIG. 6.

A reference numeral 711 indicates the coherent time of the path gain estimation, and a reference numeral 713 indicates the coherent time of the angle estimation. As shown in FIG. 7, the coherent time of the path gain estimation may be shorter than the coherent time of the angle estimation.

The disclosure may decompose the IRS combined channel into the BS-IRS angle, the IRS-UE angle, and the BS-IRS and IRS-UE path gains, estimate static BS-IRS angle information 705 only once in the communications, estimate semi-static IRS-UE angle information 713 with a long period, and measure the time-varying BS-IRS and IRS-UE path gain information 707 in every slot, using characteristics that the coherent times of the BS-IRS angle, the IRS-UE angle, and the BS-IRS and IRS-UE path gains are different.

Figure 8:
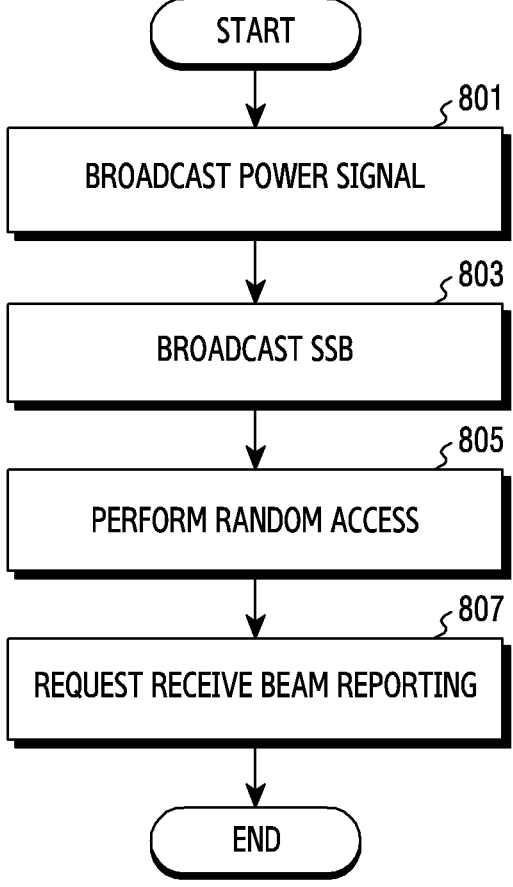
FIG. 8 is a flowchart illustrating an operating method of a BS in initial access between the BS and an IRS in a wireless communication system according to an embodiment.

FIG. 8 is a flowchart illustrating an operating method of a BS in initial access between the BS and an IRS in a wireless communication system according to an embodiment.

Referring to FIG. 8, in step 801, the BS broadcasts a power signal of the IRS. The power signal may be broadcast through a physical broadcast channel (PBCH).

In step 803, the BS broadcasts an SSB.

In step 805, the BS performs random access with the IRS.

In step 807, the BS requests receive beam reporting from the control unit of the IRS. Specifically, in step 807, after the random access ends in step 805, the BS may request the receive beam reporting from the IRS, and the IRS may transmit a receive beam index via a physical uplink control channel (PUCCH).

Figure 9:
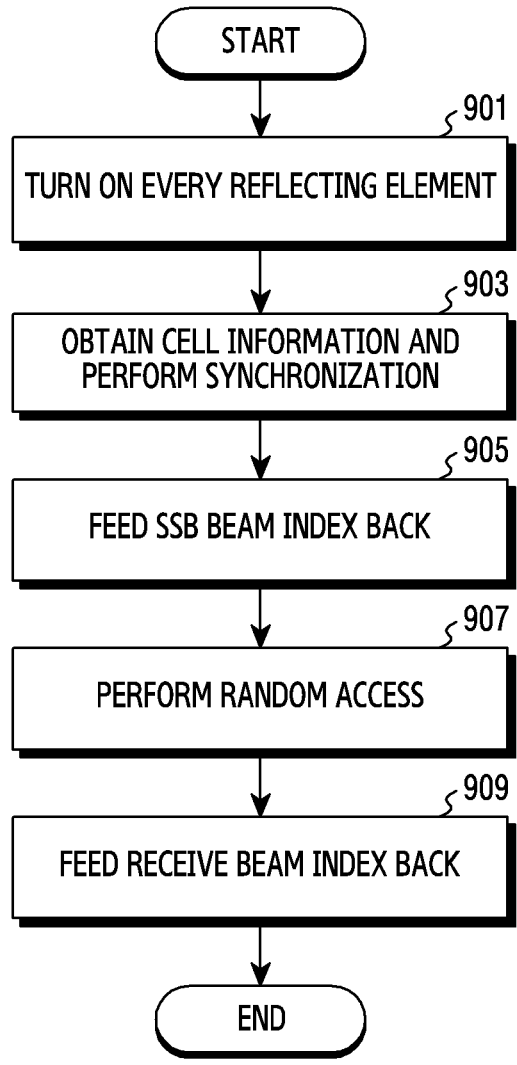
FIG. 9 is a flowchart illustrating an operating method of an IRS in initial access between a BS and the IRS in a wireless communication system according to an embodiment.

FIG. 9 is a flowchart illustrating an IRS operating method in initial access between a BS and an IRS in a wireless communication system according to an embodiment.

Referring to FIG. 9, in step 901, the IRS turns on every reflecting element of a reflecting element unit of the IR. Before step 901, the IRS may receive an IRS power signal broadcast by the BS.

In step 903, the IRS obtains cell information and performs synchronization for the initial access to the BS. In step 903, the IRS may perform receive beam sweeping by adjusting the reflection coefficient of an IRS reflective element. The reflection coefficient vector for the receive beam sweeping may be a code word of an IRS reflection coefficient codebook for the channel estimation. The code word may be known in advance to the IRS control unit.

A specific code word $$\phi_t^{(i)}$$

may be expressed as shown in Equation (5).

$$\phi_t^{(i)} = a_I\left(\frac{2\pi(t-1)}{T}\right), t = 1 \ldots, T \qquad (5)$$

In Equation (5), $a_I$ denotes the IRS direction vector, t denotes a code word index, and T denotes the total number of the code words (or a codebook size).

In step 905, the IRS transmits a detected SSB beam index to the BS. The detected SSB beam index may be transmitted over the PUCCH.

In step 907, the IRS performs random access with the BS. Specifically, the random access may be performed by transmitting a preamble over a physical random access channel (PRACH) connected with the detected SSB. Step 907 may correspond to the same process as in step 805 of FIG. 8.

In step 909, the IRS transmits the receive beam index to the BS. Step 909 may be performed in response to step 807 of the BS requesting the receive beam reporting from the IRS.

Figure 10:
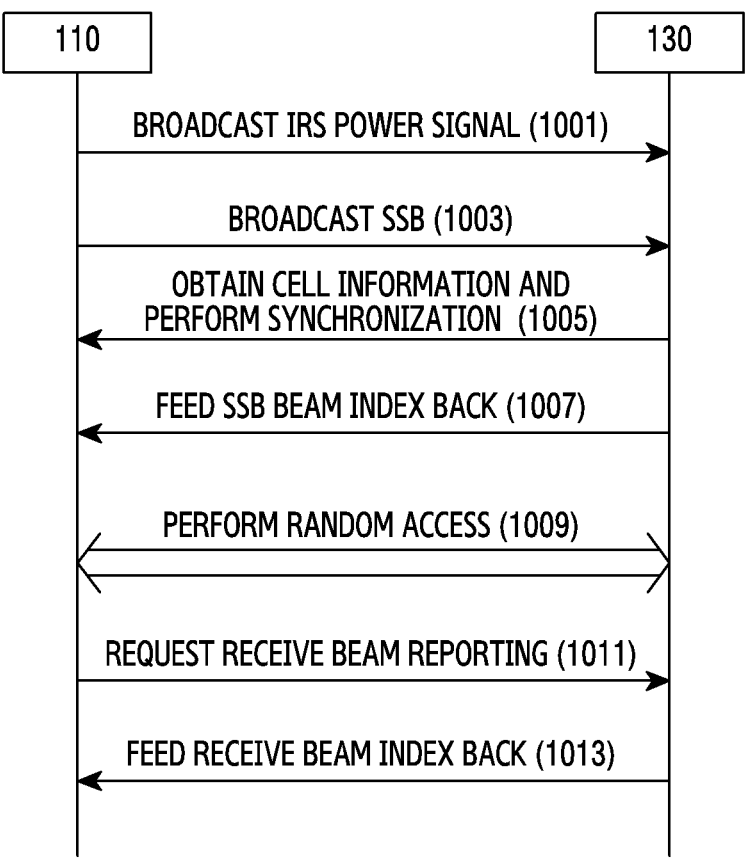
FIG. 10 is a signal flow diagram illustrating signal exchange between a BS and an IRS for initial access between the BS and the IRS in a wireless communication system, according to an embodiment.

FIG. 10 is a signal flow diagram illustrating signal exchange between a BS and an IRS for initial access between the BS and the IRS in a wireless communication system, according to an embodiment.

Referring to FIG. 10, the BS 110 broadcasts a power signal of the IRS 130 over the PBCH in step 1001. Step 1001 may correspond to step 801 of FIG. 8.

In step 1003, the BS 110 broadcasts an SSB. Step 1003 may correspond to step 803 of FIG. 8.

In step 1005, the IRS 130 obtains cell information and performs synchronization. Step 1005 may correspond to step 903 of FIG. 9.

In step 1007, the IRS 130 transmits an SSB beam index to the BS 110. Step 1007 may correspond to step 904 of FIG. 9.

In step 1009, the BS 110 performs random access with the IRS 130. Step 1009 may correspond to step 909 of FIG. 9.

In step 1011, the BS 110 requests receive beam reporting from the IRS 130. Step 1011 may correspond to step 807 of FIG. 8.

In step 1013, the IRS 130 transmits a receive beam index to the BS 110. Step 1013 may correspond to step 909 of FIG. 9.

The step shown in FIGS. 8, 9, and 10 may be omitted if the BS 110 and the IRS 130 or the control unit 430 of the IRS 130 are connected over a wired network.

FIG. 11 is a flowchart illustrating a method of a BS for estimating an angle between a BS and an IRS in a wireless communication system according to an embodiment. Specifically, the method of FIG. 11 is performed if the BS and the IRS or the control unit of the IRS are connected by radio.

Referring to FIG. 11, in step 1101, the BS obtains the AoD θ between the BS and the IRS based on detected SSB beam index information. The SSB beam index may one-to-one correspond to the AoD θ. For example, an index 3 may indicate 60 degrees, and an index 7 may indicate 70 degrees. The IRS may identify index information of the SSB having the greatest received strength among a plurality of SSBs transmitted by the BS, and obtain the AoD θ corresponding to the SSB index information of the greatest received strength.

In step 1103, the BS obtains the AoA φ between the BS and the IRS based on received beam index information. The received beam index may one-to-one correspond to the AoA φ. The IRS may receive the SSB by changing the receive beam in several directions, and acquire the AoA φ by detecting the direction of the greatest signal strength among the received SSBs.

FIG. 12 is a flowchart illustrating a method of a BS for estimating an angle between the BS and an IRS in a wireless communication system, according to an embodiment. Specifically, the method of FIG. 12 is performed if the BS and the IRS or the control unit of the IRS are connected by cable.

Referring to FIG. 12, in step 1201, the BS receives location information of the IRS from a control unit of the IRS. That is, the IRS may transmit the location directly to the BS.

In step 1203, the AoD θ and the AoA φ of the BS and the IRS are obtained based on the location information.

Figure 13:
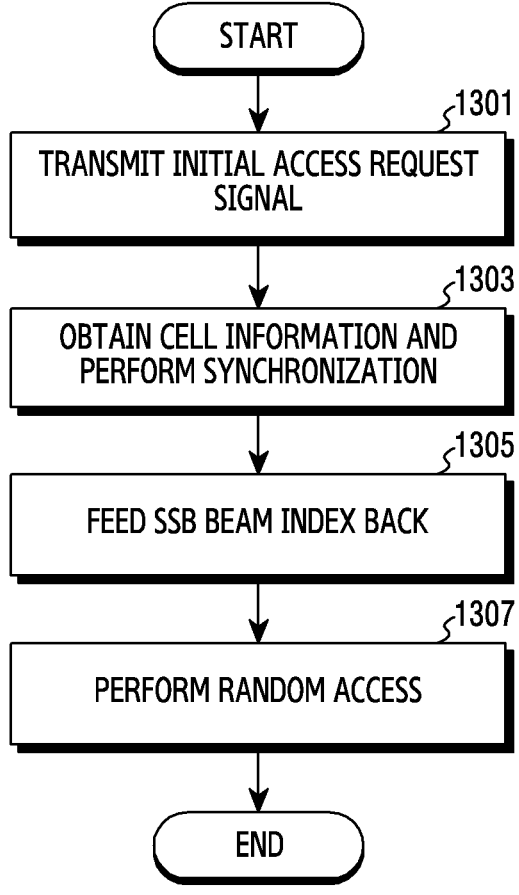
FIG. 13 is a flowchart illustrating an operating method of a terminal for initial access of the terminal in a wireless communication system according to an embodiment.

FIG. 13 is a flowchart illustrating an operating method of a UE for initial access of the UE in a wireless communication system according to an embodiment. Specifically, the method of FIG. 13 is performed when the UE is located in a dead zone. That is, the UE is located in the dead zone and receives no SSBs from the BS.

Referring to FIG. 13, in step 1301, the UE transmits an initial access request signal to the IRS.

In step 1303, the UE obtains cell information from a BS SSB and performs synchronization. The BS SSB may be an SSB reflected by the IRS. Specifically, the IRS may reflect the BS SSB to the UE based on an IRS control codebook.

In step 1305, the UE transmits a detected SSB beam index to the BS. The detected SSB beam index may be transmitted over the PUCCH.

In step 1307, the UE performs random access with the BS. The random access may be performed by transmitting a preamble over the PRACH and the detected SSB.

Transmitting the detected SSB beam index to the BS may be performed after a time by multiplying a half of the IRS phase control codebook length by a BS SSB period (e.g., 20 ms) from the SSB detection. For example, if the half of the IRS phase control codebook length is 16, the UE may transmit the SSB beam index to the BS after 160 ms after the SSD detection. This is determined based on a feature that, if the IRS reflection beam reaches the UE by applying an n-th phase control code word to a transmit beam of the BS according to uplink-downlink channel reciprocity, the IRS reflection beam arrives the BS by applying an (n+N/2)-th phase control code word to the SSB beam index transmission of the UE (where, n is a positive integer).

Figure 14:
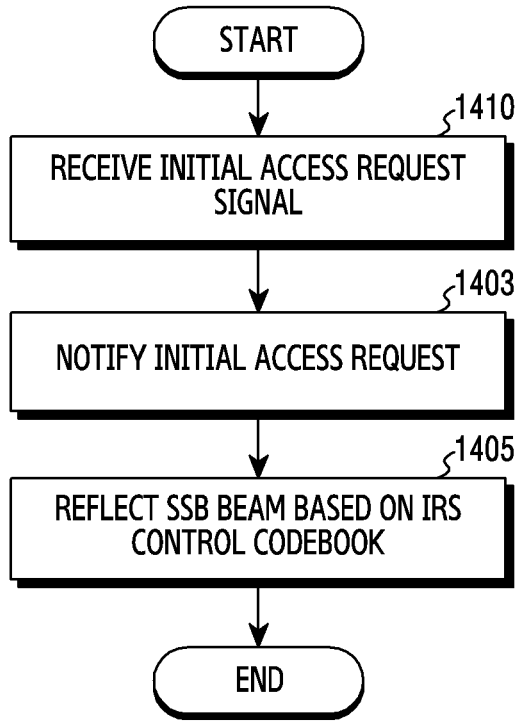
FIG. 14 is a flowchart illustrating an operating method of an IRS for initial access of a terminal in a wireless communication system according to an embodiment.

FIG. 14 is a flowchart illustrating an operating method of an IRS for initial access of a UE in a wireless communication system according to an embodiment. Specifically, the method of FIG. 14 is performed when the UE is located in a dead zone. That is, the UE is located in the dead zone and receives no SSBs from the BS 110.

Referring to FIG. 14, in step 1401, the IRS receives an initial access request signal.

In step 1403, the IRS notifies the BS that the UE located in the dead zone requests the initial access. Step 403 may be performed in response to step 1401.

In step 1405, the IRS reflects a BS SSB beam to the UE based on the IRS control codebook.

Figure 15:
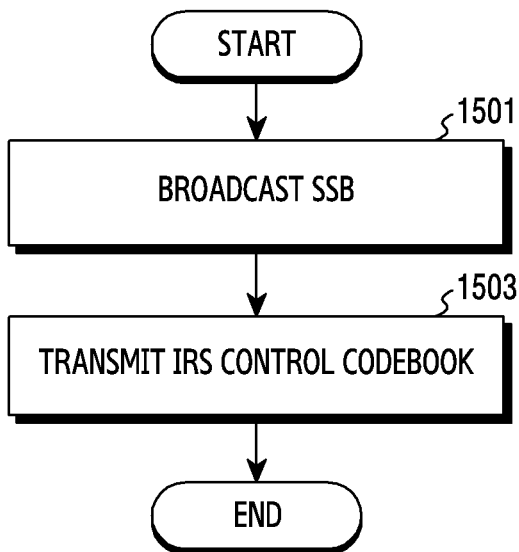
FIG. 15 is a flowchart illustrating an operating method of a BS for initial access of a terminal in a wireless communication system according to an embodiment.
Figure 16:
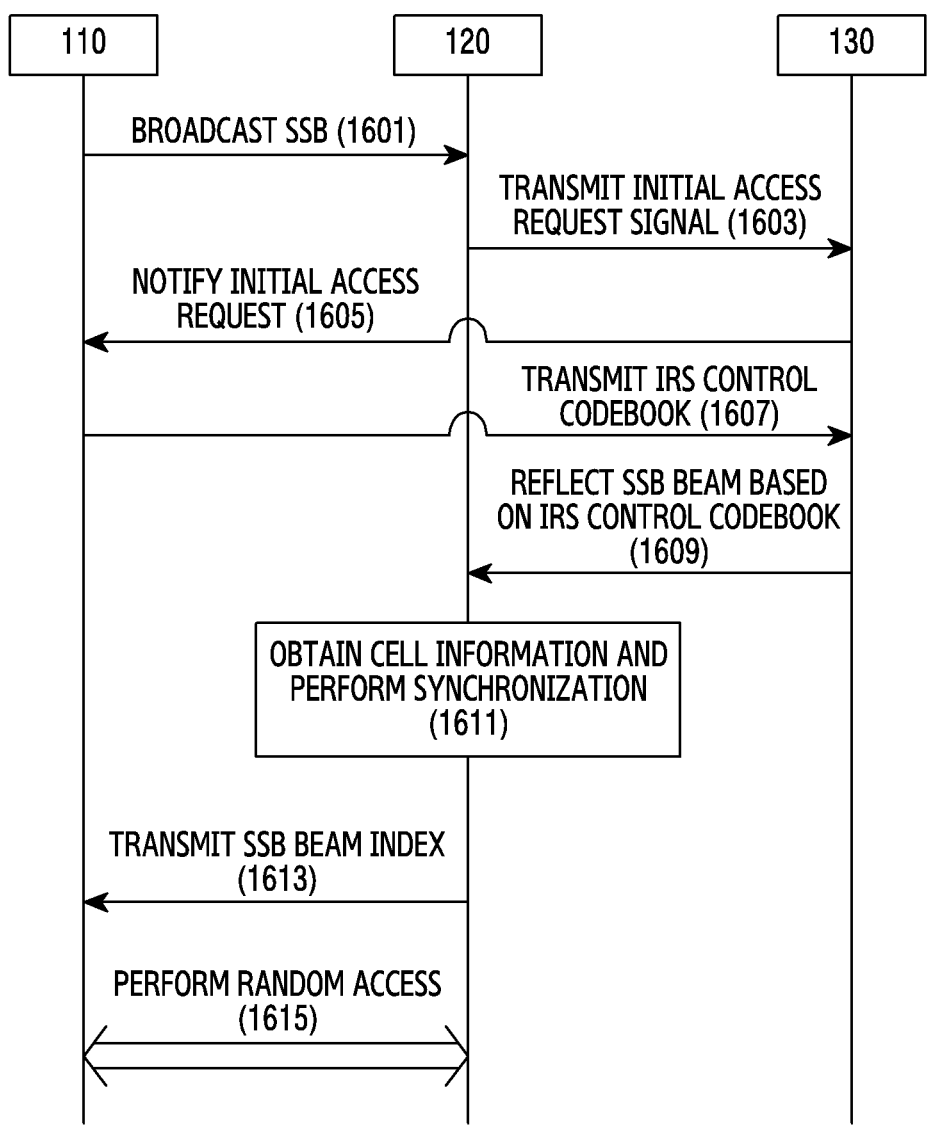
FIG. 16 is a signal flow diagram illustrating signal exchange between a BS, an IRS, or a terminal for initial access of the terminal in a wireless communication system, according to an embodiment.

FIG. 15 is a flowchart illustrating an operating method of a BS for initial access of a UE in a wireless communication system according to an embodiment. Specifically, the method of FIG. 15 is performed when the UE is located in a dead zone. That is, the UE is located in the dead zone and receives no SSBs from the BS.

Referring to FIG. 15, in step 1501, the BS broadcasts an SSB.

In step 1503, the BS transmits an IRS control codebook for the initial access to the IRS. Step 1503 may be performed in response to step 1403 of FIG. 14.

The IRS control codebook for the initial access may be transmitted via an IRS control link. Specifically, the IRS control codebook for the initial access may be generated based on the BS transmit beam index obtained in estimating the BS-IRS angle. Each code word of the IRS control codebook may be the same as Equation (5) of the IRS initial access. The IRS may reflect the BS SSB beam by applying the phase shift according to the IRS control codebook for the initial access if the BS SSB beam heads for the IRS. For example, if the number of the code words is N, the phase shift may be performed according to each code word at 20 ms which is the BS SSB period.

FIG. 16 is a signal flow diagram illustrating signal exchange between a BS, an IRS, or a UE for initial access of the UE in a wireless communication system, according to an embodiment.

Referring to FIG. 16, in step 1601, the BS 110 may broadcast an SSB. Step 1601 corresponds to step 1501 of FIG. 15.

In step 1603, the UE 120 transmits an initial access request signal. Step 1603 corresponds to step 1301 of FIG. 13.

In step 1605, the IRS 130 notifies the BS 130 that the UE 120 located in the dead zone requests the initial access. Step 1605 corresponds to step 1403 of FIG. 14.

In step 1607, the BS 110 transmits an IRS control codebook for the initial access to the IRS 130. Step 1607 corresponds to step 1503 of FIG. 15.

In step 1609, the IRS 130 reflects a BS SSB beam to the UE 120 based on the IRS control codebook. Step 1609 corresponds to step 1405 of FIG. 14.

In step 1611, the UE 120 obtains cell information from the BS SSB of step 1609 and performs synchronization. Step 1611 corresponds to step 1303 of FIG. 13.

In step 1613, the UE 120 transmits an SSB beam index to the BS 110. Step 1613 corresponds to step 1305 of FIG. 13.

In step 1615, the UE 120 performs random access with the BS 110. Step 1615 corresponds to step 1307 of FIG. 13.

By contrast, if the UE 120 is not located in the dead zone, the connection of the BS 110 and the UE 120 is maintained, the BS 110 does not transmit the IRS control signal for the initial access to the control unit 403 of the IRS 130, unlike the operating method of FIG. 13, 14, 15, or 16, and the UE 120 may perform the initial access by directly receiving the SSB from the BS 110.

Figure 17:
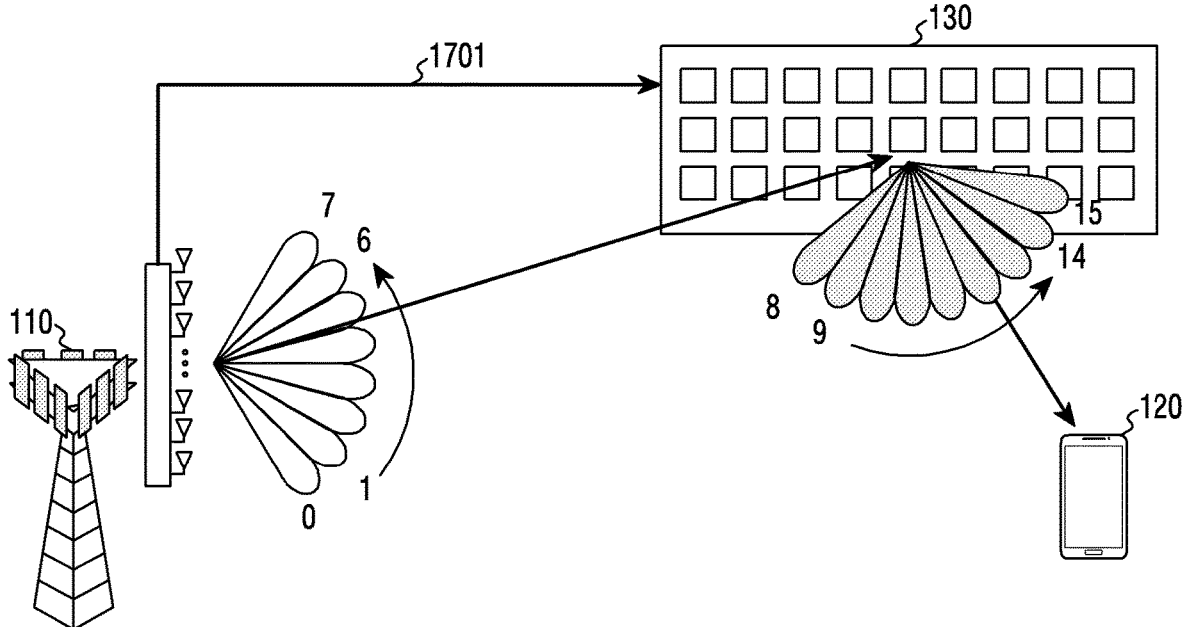
FIG. 17 illustrates angle estimation between an IRS and a terminal in a wireless communication system, according to an embodiment.

FIG. 17 illustrates angle estimation between an IRS and a UE in a wireless communication system, according to an embodiment. For example, FIG. 17 may correspond to step 1607, step 1609, and step 1611.

Referring to FIG. 17, the BS 110 may perform the beamforming using a plurality of antennas. The BS 110 may broadcast an SSB through the beamforming. Specifically, the BS 110 may transmit the SSB toward the IRS 130 by selecting one of beams 0 through 7 of the BS 110 based on the AoD angle direction obtained in step 1011 or step 1203. The index 0 through 7 shown in FIG. 17 indicates the SSB beam index.

The BS 110 and the IRS 130 may be connected by a control link 1701.

The IRS 130 may also perform the beamforming. Specifically, the IRS 130 may reflect the SSB toward the UE 120 based on a code word received based on the SSB received from the BS 110. The index 8 through 15 shown in FIG. 17 indicates the SSB beam index reflected by the IRS 130. The UE 120 may communicate with the BS 110 through the reflected SSB beam index.

Figure 18:
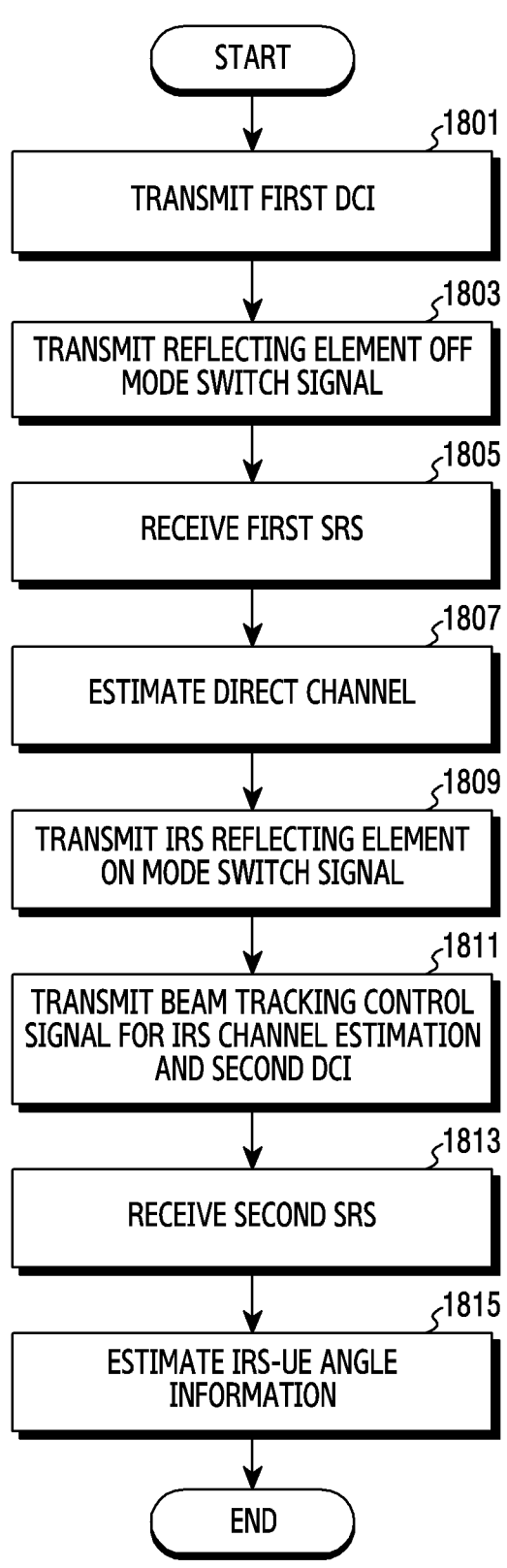
FIG. 18 is a flowchart illustrating an operating method of a BS for angle estimation between an IRS and a terminal in a wireless communication system, according to an embodiment.

FIG. 18 is a flowchart illustrating an operating method of a BS for angle estimation between an IRS and a UE in a wireless communication system, according to an embodiment.

Referring to FIG. 18, in step 1801, the BS transmits first downlink control information (DCI) to the UE. The DCI may indicate SRS transmission to the UE. The DCI may be transmitted through a UE link between the BS and the UE.

In step 1803, the BS transmits a reflecting element OFF mode switch signal to the IRS. The reflecting element OFF mode switch signal may be transmitted via an IRS control link between the BS and the IRS.

In step 1805, the BS receives a first sounding reference signal (SRS) from the UE. The SRS may be indicated by the DCI.

In step 1807, the BS estimates a direct channel between the BS and the UE based on the received SRS.

The received SRS (hereafter, the SRS receive signal) may be expressed shown in Equation (6).

$$y_2^{(i)} = h_d^{(i)} x_2^{(i)} + n_2^{(i)} \tag{6}$$

US 12,634,712 B2

19

20

In Equation (6), $$y_2^{(i)} \in \mathbb{C}^{number\ of\ BS\ antennas\times 1},\ h_d^{(i)} \in \mathbb{C}^{number\ of\ BS\ antennas\times 1},$$
$$n_2^{(i)} \in \mathbb{C}^{number\ of\ BS\ antennas\times 1},\ x_2^{(i)}$$

denotes a scalar, $$y_2^{(i)}$$

denotes the SRS received signal, $$h_d^{(i)}$$

denotes the direct channel, and $$n_2^{(i)}$$

denote a noise.

The direct channel of the BS and the UE estimated based on the SRS receive signal may be expressed as shown in Equation (7).

$$\hat{h}_d^{(i)} = \left(x_2^{(i)}\right)^* y_2^{(i)} \tag{7}$$

In Equation (7), $$y_2^{(i)} \in \mathbb{C}^{number\ of\ BS\ antennas\times 1},\ \hat{h}_d^{(i)} \in \mathbb{C}^{number\ of\ BS\ antennas\times 1},\ x_2^{(i)}$$

denotes the scalar, and $$\hat{h}_d^{(i)}$$

denotes the direct channel.

In step 1809, the BS transmits an IRS reflecting element ON mode switch signal to the IRS. Based on the IRS reflecting element ON mode switch signal, the IRS may turn on every reflecting element. Step 1809 may be transmitted via the IRS control link between the BS and the IRS.

In step 1811, the BS transmits a beam tracking control signal for IRS channel estimation to the IRS and transmits second DCI to the UE. The second DCI may indicate second SRS transmission. The DCI may be transmitted via the BS-UE link. The beam tracking control signal for the IRS channel estimation may indicate an IRS phase shift vector value of Equation (8).

In step 1813, the BS receives a second SRS. The received SRS signal (hereafter, the receive SRS signal) may be expressed as shown in Equation (8).

$$y_t^{(i)} = \left(h_d^{(i)} + H^{(i)}\phi_t^{(i)}\right)x_t^{(i)} + n_t^{(i)} \tag{8}$$

In Equation (8), $$y_t^{(i)} \in \mathbb{C}^{number\ of\ BS\ antennas\times 1},\ h_d^{(i)} \in \mathbb{C}^{number\ of\ BS\ antennas\times 1},$$
$$n_t^{(i)} \in \mathbb{C}^{number\ of\ BS\ antennas\times 1},\ x_t^{(i)} \in \mathbb{C}^{number\ of\ BS\ antennas\times 1},$$
$$H^{(i)} \in \mathbb{C}^{number\ of\ BS\ antennas\times number\ of\ IRS\ reflecting\ elements},$$
$$\phi_t^{(i)} \in \mathbb{C}^{number\ of\ IRS\ reflecting\ elements\times 1},\ y_t^{(i)}$$

denotes the SRS receive signal, $$h_d^{(i)}$$

denotes the direct channel, $$n_t^{(i)}$$

denote the noise, $H^{(i)}$ denotes the combined channel, and $$\phi_t^{(i)}$$

denotes the reflection coefficient vector.

The IRS may reflect the second SRS signal by adjusting the IRS channel estimation beam tracking control signal (or the IRS phase shift vector value), wherein the BS may receive the second SRS.

In step 1815, the BS obtains IRS-UE angle information based on the received SRS signal. Specifically, the BS obtains the beam index of the greatest received SRS signal and obtains its corresponding angle information as the IRS-UE angle information.

Step 1815 may be expressed as shown in Equations (9) and (10).

$$t_{max} = \operatorname*{argmax}_{t} \left\| \left(x_t^{(i)}\right)^* y_t^{(i)} - h_d^{(i)} \right\| \tag{9}$$

In Equation (9), $$x_t^{(i)}$$

denotes an SRS transmitted by the UE in an i-th symbol and is a scalar value.

$$y_t^{(i)}$$

denotes the received SRS signal of the BS in the i-th symbol, and $$y_t^{(i)} \in \mathbb{C}^{number\ of\ BS\ antennas \times 1}.$$

$$\psi = \frac{2\pi(t_{max} - 1)}{T} \tag{10}$$

In Equation (10), t denotes a natural number from the SRS beam index 1 to T, $t_{max}$ denotes the beam index of the greatest signal strength, $\psi$ denotes the IRS-UE angle, and T denotes the total number of code words (or the codebook size).

Figure 19:
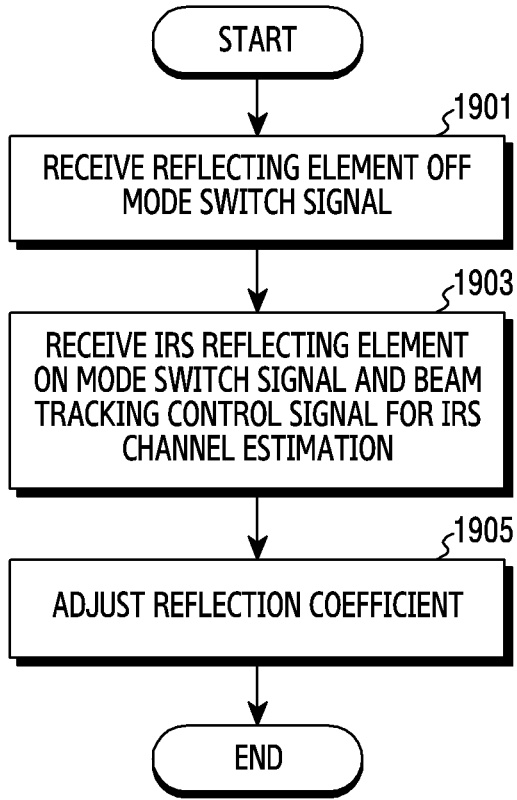
FIG. 19 is a flowchart illustrating an operating method of an IRS for angle estimation between an IRS and a terminal in a wireless communication system, according to an embodiment.

FIG. 19 is a flowchart illustrating an operating method of an IRS for angle estimation between the IRS and a UE in a wireless communication system, according to an embodiment.

Referring to FIG. 19, in step 1901, the IRS receives a reflecting element OFF mode switch signal from a BS. The IRS may turn off the reflecting element mode according to the reflecting element OFF mode switch signal. Step 1901 may be received via the IRS control link.

In step 1903, the IRS receives an IRS reflecting element ON mode switch signal and a beam tracking control signal for IRS channel estimation from the BS. Step 1903 may be received via the IRS control link. The IRS channel estimation beam tracking control signal may include a code word or a code word index of a phase control codebook for channel estimation. Specifically, the BS may select the code word from the channel estimation phase control codebook and transmit the code word or the code word index to the IRS.

In step 1905, the IRS adjusts the reflection coefficient of the reflecting element. The reflection coefficient may be adjusted according to the code word of the channel estimation phase control codebook. The code word of the channel estimation phase control codebook may improve channel estimation performance by narrowing a beamwidth unlike the code word of the initial access phase control codebook. The code word $$\phi_t^{(i)}$$

may be expressed as shown in Equation (11).

$$\phi_t^{(i)} = a_I\left(\frac{2\pi(t-1)}{T}\right), t = 1 \ ..., T \tag{11}$$

In Equation (11), $a_I$ denotes the IRS direction vector, t denotes the code word index, and T denotes the total number of the code words (or the codebook size).

Figure 20:
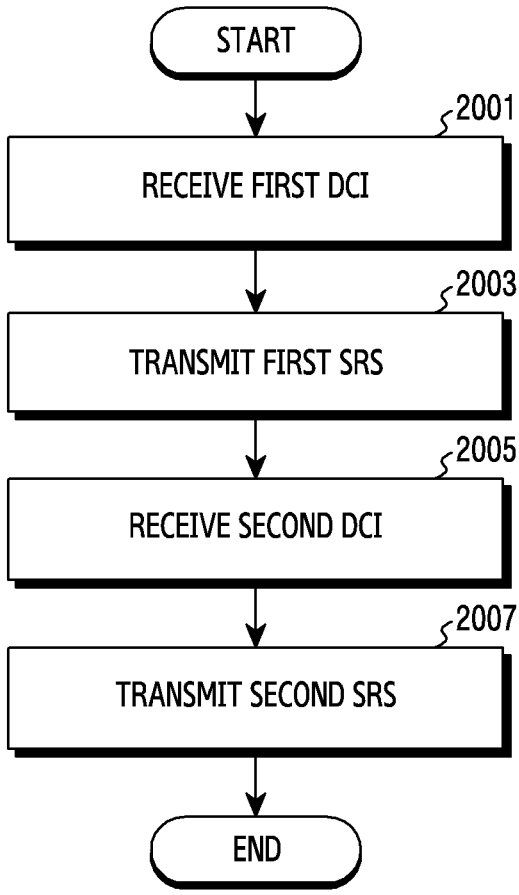
FIG. 20 is a flowchart illustrating an operating method of a terminal for angle estimation between an IRS and the terminal in a wireless communication system, according to an embodiment.

FIG. 20 is a flowchart illustrating an operating method of a UE for angle estimation between an IRS and the UE in a wireless communication system, according to an embodiment.

Referring to FIG. 20, in step 2001, the UE receives first DCI from the BS. The first DCI may be received via the UE link.

In step 2003, the UE transmits a first SRS. The first DCI may indicate first SRS transmission.

In step 2005, the UE receives second DCI from the BS. The second DCI may be received via the UE link.

In step 2007, the UE transmits a second SRS. The second DCI may indicate second SRS transmission.

FIG. 21 is a signal flow diagram illustrating signal exchange between a BS, an IRS, and a UE for estimating an angle between the IRS and the UE in a wireless communication system, according to an embodiment.

Referring to FIG. 21, in step 2101, the BS 110 transmits first DCI to the UE 120. Step 2101 may correspond to step 1801 of FIG. 18.

In step 2103, the BS 110 transmits an IRS reflecting element OFF mode switch signal to the IRS 130. Step 2103 may correspond to step 1803 of FIG. 18.

In step 2105, the UE 120 transmits a first SRS for direct channel estimation between the BS 110 and the UE 120. Step 2105 may correspond to step 2003 of FIG. 20.

In step 2107, the BS 110 transmits an IRS reflecting element ON mode switch signal to the IRS 130. Step 2107 may correspond to step 1809 of FIG. 18.

In step 2109, the BS 110 transmits a beam tracking control signal for IRS channel estimation and second DCI to the UE 120. Step 2109 may correspond to step 1811 of FIG. 18.

In step 2111, the UE 120 transmits a second SRS to the BS 110. Step 2111 may correspond to step 2007 of FIG. 20.

FIG. 22 illustrates a slot configuration diagram for angle estimation between an IRS and a UE in a wireless communication system, according to an embodiment.

Referring to FIG. 22, link 2201 is an IRS control link between the BS 110 and the IRS 130, and link 2203 is a UE link between the BS 110 and the UE 120. A crosshatched block 2205 indicates a downlink symbol, and a shaded block 2207 indicates an uplink symbol. Numbers 1, 2, 3, . . . i shown in FIG. 22 indicate slot numbers.

In a first downlink symbol, the BS may transmit a reflecting element OFF mode switch signal to the IRS via the IRS control link 2201 (corresponding to step 1803 of FIG. 18). Also, the BS may transmit first DCI to the UE via the UE link 2203.

In a second uplink symbol, a control unit of the IRS may switch every reflecting element to the OFF mode (corresponding to step 1901 of FIG. 19), and the UE may transmit a first SRS in the uplink (corresponding to step 2003 of FIG. 20). The BS may estimate a direct channel based on the first SRS (corresponding to step 1807 of FIG. 18).

In a third downlink symbol, the BS may transmit an IRS reflecting element ON mode switch signal to the IRS via the IRS control link 2201 (corresponding to step 1809 of FIG. 18), and switch every reflecting element to the ON mode.

In a fourth downlink symbol, the BS may transmit second DCI to the UE (corresponding to step 1811 of FIG. 18), and transmit a beam control request signal for channel estimation to the IRS (corresponding to step 1811 of FIG. 18).

In fifth through i-th downlink symbols, the UE may transmit an SRS in the uplink (corresponding to step 2207 of FIG. 20), and the IRS may adjust the reflection coefficient according to a code word of a channel estimation phase control codebook for each symbol (corresponding to step 1905 of FIG. 19).

Figure 23:
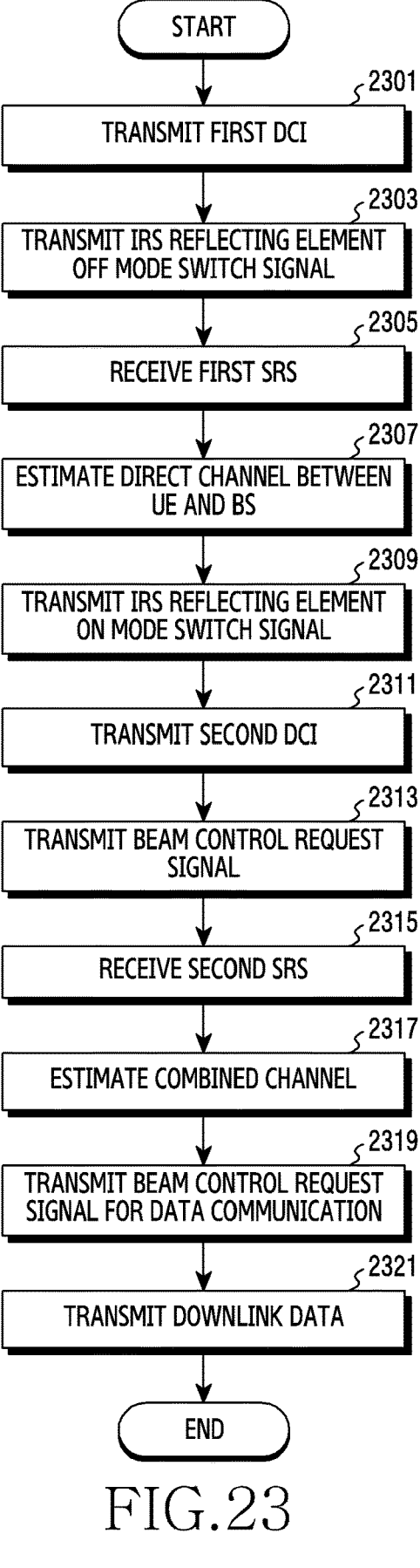
FIG. 23 is a flowchart illustrating an operating method of a BS for estimating a path gain between an IRS and a terminal and estimating a path gain between the IRS and the BS in a wireless communication system, according to an embodiment.

FIG. 23 is a flowchart illustrating an operating method of a BS for path gain estimation between an IRS and a UE and path gain estimation between the IRS and the BS in a wireless communication system, according to an embodiment.

Referring to FIG. 23, in step 2301, the BS transmits first DCI to the UE. The first DCI may indicate SRS transmission to the UE. The DCI may be transmitted via the UE link.

In step 2303, the BS transmits an IRS reflecting element OFF mode switch signal to the IRS. The reflecting element of the IRS may be turned off by the IRS reflecting element OFF mode switch signal. The IRS reflecting element OFF mode switch signal may be transmitted via the IRS control link.

In step 2305, the BS receives, from the UE, a first SRS for direct channel estimation between the BS and the UE.

In step 2307, the BS estimates the direct channel between the UE and the BS based on the received SRS signal (hereafter, the SRS receive signal). Step 2307 may be expressed as shown in Equations (12) and (13).

$$y_2^{(i)} = h_d^{(i)} x_2^{(i)} + n_2^{(i)} \tag{12}$$

In Equation (12), $$y_2^{(i)} \in \mathbb{C}^{number\ of\ BS\ antennas \times 1},\ h_d^{(i)} \in \mathbb{C}^{number\ of\ BS\ antennas \times 1},$$

$$x_2^{(i)} \in \mathbb{C},\ n_2^{(i)} \in \mathbb{C}^{number\ of\ BS\ antennas \times 1},\ y_2^{(i)}$$

denotes the SRS receive signal, $$h_d^{(i)}$$

denotes the direct channel, $$x_2^{(i)}$$

denotes an SRS transmit signal, and $$n_2^{(i)}$$

denote the noise.

$$\hat{h}_d^{(i)} = \left(x_2^{(i)}\right)^* y_2^{(i)} \tag{13}$$

In Equation (13), $$\hat{h}_d^{(i)} \in \mathbb{C}^{number\ of\ BS\ antennas \times 1},\ y_2^{(i)} \in \mathbb{C}^{number\ of\ BS\ antennas \times 1},\ x_2^{(i)} \in \mathbb{C},\ \hat{h}_d^{(i)}$$

denotes the estimated direct channel, $$y_2^{(i)}$$

denotes the SRS receive signal, and $$x_2^{(i)}$$

denotes the SRS transmit signal.

In step 2309, the BS transmits an IRS reflecting element ON mode switch signal to the IRS. Based on the IRS reflecting element ON mode switch signal, the IRS may turn on every reflecting element.

In step 2311, the BS transmits second DCI to the UE. The second DCI may indicate the SRS transmission to the UE.

In step 2313, the BS transmits a beam control request signal for channel estimation to the IRS. In so doing, the BS may calculate and transmit a beam index of a reflection coefficient code word. The specific beam index is determined based on the BS-IRS AoD θ obtained in the BS-IRS angle estimation and the IRS-UE AoD φ obtained in the IRS-UE angle estimation, e.g., as shown in Equation (14).

$$\phi_t = a_I(\varphi) \odot a_I^*(\theta) \tag{14}$$

In Equation (14), $\phi_t$ is the reflection coefficient vector, $\alpha_I$ is the IRS direction vector, $\theta$ is the BS-IRS AoD, $\varphi$ is the IRS-UE AoD, and $\odot$ is the element-wise product.

In step 2315, the BS receives a second SRS from the UE. The received SRS signal (hereafter, the SRS receive signal) may be expressed as shown in Equation (15).

$$y_t^{(i)} = \left(h_d^{(i)} + H^{(i)} \phi_t^{(i)}\right) x_t^{(i)} + n_t^{(i)} \tag{15}$$

In Equation (15), $$y_t^{(i)} \in \mathbb{C}^{number\ of\ BS\ antennas \times 1},\ h_d^{(i)} \in \mathbb{C}^{number\ of\ BS\ antennas \times 1},$$

$$n_t^{(i)} \in \mathbb{C}^{number\ of\ BS\ antennas \times 1},\ x_t^{(i)} \in \mathbb{C}^{number\ of\ BS\ antennas \times 1},$$

$$H^{(i)} \in \mathbb{C}^{number\ of\ BS\ antennas \times number\ of\ IRS\ reflecting\ elements},$$

$$\phi_t^{(i)} \in \mathbb{C}^{number\ of\ IRS\ reflecting\ elements \times 1},\ y_t^{(i)}$$

denotes the SRS receive signal, $$h_d^{(i)}$$

denotes the direct channel, $$n_2^{(i)}$$

denote the noise, $H^{(i)}$ denotes the combined channel, and $$\phi_t^{(i)}$$

denotes the reflection coefficient vector.

In step 2317, the BS obtains the combined channel based on the SRS receive signal. The combined channel may be expressed as shown in Equation (16).

$$\gamma^{(i)}\alpha^{(i)} = y^{(i),H}a_B(\theta) \tag{16}$$

In Equation (16), $\gamma$ is the BS-IRS path gain, $\alpha$ is the IRS-UE path gain, $y^{(i)}$ is the SRS receive signal, $a_B$ is the BS direction vector, $y^{(i)} \in \mathbb{C}^{number\ of\ BS\ antennas \times 1}$, and $\alpha_B \in \mathbb{C}^{number\ of\ BS\ antennas \times 1}$.

In step 2319, the BS transmits a beam control request signal for data communication to the IRS. Specifically, the BS selects an IRS reflection coefficient for data communication in the reflection coefficient codebook included in the beam control request signal for the data communication and transmits an index of the selected code word to the IRS.

The beam control request signal for the data communication may include the reflection coefficient codebook, and the code word index corresponding to the reflection coefficient codebook.

In step 2321, the BS transmits downlink data based on the IRS to the UE.

Figure 24:
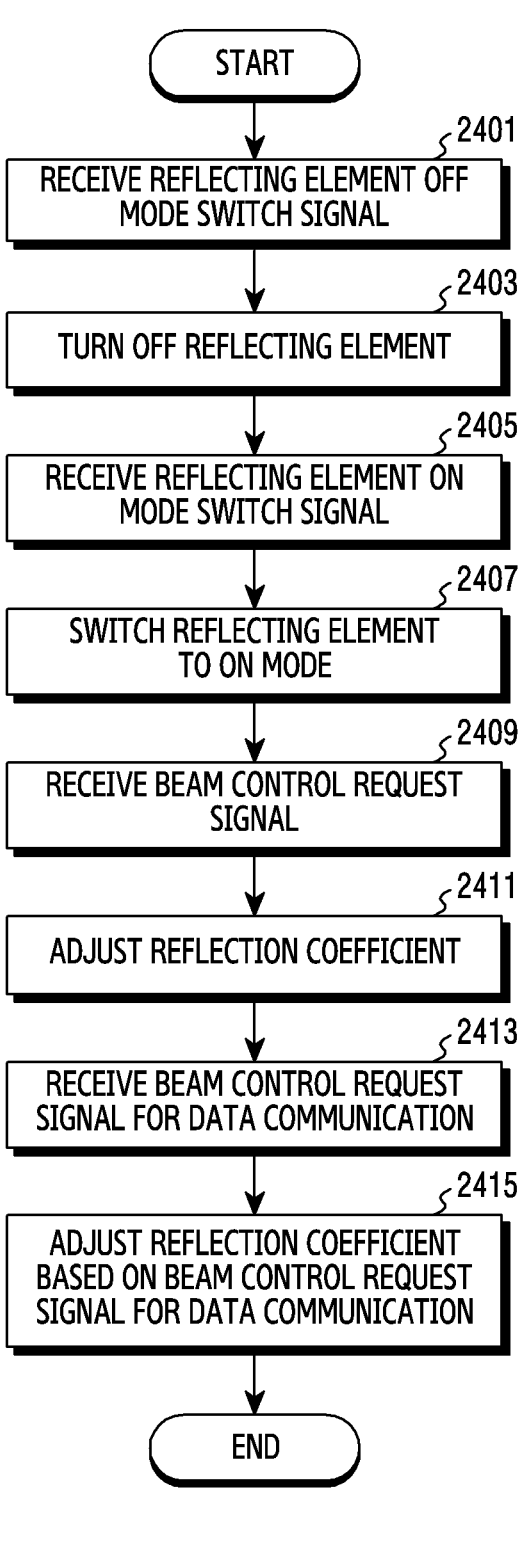
FIG. 24 is a flowchart illustrating an operating method of an IRS for estimating a path gain between the IRS and a terminal and estimating a path gain between the IRS and a BS in a wireless communication system, according to an embodiment.

FIG. 24 is a flowchart illustrating an operating method of an IRS for path gain estimation between the IRS and a UE and path gain estimation between the IRS and a BS in a wireless communication system, according to an embodiment.

Referring to FIG. 24, the IRS receives an IRS reflecting element OFF mode switch signal from the BS, in step 2401. Step 2401 may correspond to step 2303 of FIG. 23.

In step 2403, the IRS turns off all the reflecting elements. Step 2403 may be performed in response to step 2401.

In step 2405, the IRS receives an IRS reflecting element ON mode switch signal from the BS. Step 2405 may correspond to step 2309 of FIG. 23.

In step 2407, the IRS turns on all the reflecting elements in response to the received IRS reflecting element ON mode switch signal.

In step 2409, the IRS receives a beam control request signal for channel estimation. The beam control request signal includes beam index information of the reflection coefficient code word.

In step 2411, the IRS adjusts the reflection coefficient according to the code word of the reflection coefficient codebook corresponding to the beam index information.

In step 2413, the IRS receives a beam control request signal for data communication from the BS.

In step 2415, the IRS adjusts the reflection coefficient based on the beam control request signal for the data communication. The beam control request signal for the data communication includes a reflection coefficient codebook for the data communication, and a code word index corresponding to the reflection coefficient codebook for the data communication. The BS may adjust the reflection coefficient of the reflecting element according to the code word index and transmit data to the UE.

Figure 25:
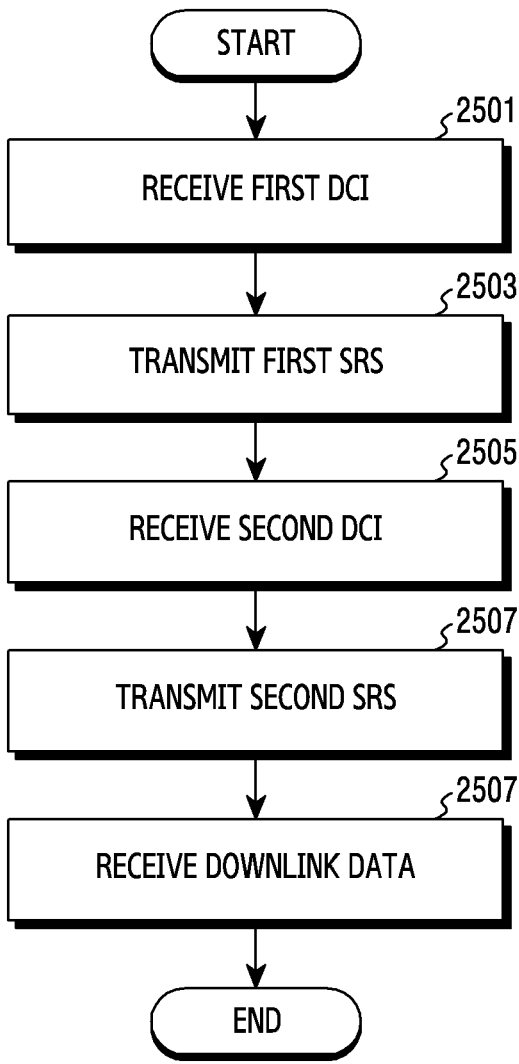
FIG. 25 is a flowchart illustrating an operating method of a terminal for estimating a path gain between an IRS and the terminal and estimating a path gain between the IRS and a BS in a wireless communication system, according to an embodiment.

FIG. 25 is a flowchart illustrating an operating method of a UE for path gain estimation between an IRS and the UE and path gain estimation between the IRS and a BS in a wireless communication system, according to an embodiment.

Referring to FIG. 25, the UE receives first DCI, in step 2501. Step 2501 may correspond to step 2301 of FIG. 23.

In step 2503, the UE transmits, to the BS, a first SRS for direct channel estimation between the BS and the UE. The first SRS transmission of step 2503 may be indicated by the DCI.

In step 2505, the UE receives second DCI. Step 2505 may correspond to step 2311 of FIG. 23.

In step 2507, the UE transmits a second SRS for combined channel estimation to the BS. The second SRS transmission may be indicated by the second DCI.

In step 2509, the UE receives downlink data from the BS. Step 2509 may correspond to step 2321 of FIG. 23.

FIG. 26 is a signal flow diagram illustrating signal exchange between a BS, an IRS, and a UE for path gain estimation between the IRS and the UE and path gain estimation between the IRS and the BS in a wireless communication system, according to an embodiment.

Referring to FIG. 26, in step 2601, the BS 110 transmits first DCI to the UE 120. Step 2601 may correspond to step 2301 of FIG. 23.

In step 2603, the BS 110 transmits an IRS reflecting element OFF mode switch signal to the IRS 130. Step 2603 may correspond to step 2303 of FIG. 23.

In step 2605, the UE 120 transmits a first SRS to the BS 110. Step 2605 may correspond to step 2503 of FIG. 25.

In step 2607, the BS 110 transmits an IRS reflecting element ON mode switch signal to the IRS 130. Step 2607 may correspond to step 2307 of FIG. 23.

In step 2609, the BS 110 transmits second DCI to the UE 120. Step 2609 may correspond to step 2309 of FIG. 23.

In step 2611, the BS 110 transmits a beam control request signal for channel estimation to the IRS 130. Step 2611 may correspond to step 2313 of FIG. 23.

In step 2613, the UE 120 transmits a second SRS to the BS 110. Step 2613 may correspond to step 2315 of FIG. 23.

In step 2615, the BS 110 transmits a beam control request signal for data communication to the IRS 130. Step 2615 may correspond to step 2319 of FIG. 23.

In step 2617, the BS 110 transmits downlink data to the UE 120. Step 2617 corresponds to step 2321 of FIG. 23.

FIG. 27 illustrates a slot configuration for path gain estimation between an IRS and a UE and path gain estimation between the IRS and a BS in a wireless communication system, according to an embodiment.

Referring to FIG. 27, the numbers 1, 2, 3, . . . i indicate slot numbers. Link 2701 is an IRS control link between the BS and the IRS, and link 2703 is a UE link between the BS and the UE. A crosshatched block 2705 indicates the uplink, and a shaded block 2707 indicates the downlink.

In a first downlink symbol, the BS may transmit an IRS reflecting element OFF mode switch signal to the IRS via the IRS control link 2703 (corresponding to step 2303 of FIG. 23). Also, the BS may indicate SRS transmission by transmitting first DCI to the UE via the UE link 2705 (corresponding to step 2301 of FIG. 23).

In a second uplink symbol, the IRS may switch every reflecting element to the OFF mode (corresponding to step 2403 of FIG. 24), the UE may transmit the first SRS in the uplink (corresponding to step 2503 of FIG. 25), and the BS may estimate the BS-UE direct channel based on the first SRS received.

In a third downlink symbol, the BS may transmit an IRS reflecting element ON mode switch signal via the IRS control link 2703, and the IRS may switch every reflecting element to the ON mode.

In a fourth downlink symbol, the BS may indicate uplink SRS transmission by transmitting second DCI to the UE via the UE link 2705. In addition, the BS may transmit a beam control request signal to the IRS via the IRS control link 2703.

In a fifth uplink symbol, the UE may transmit the SRS and the IRS may adjust a reflection coefficient according to a code word of a reflection coefficient codebook corresponding to a beam index.

In a sixth uplink symbol, the BS may transmit a beam control request signal for data communication to the IRS.

In seventh through i-th downlink symbols, the IRS may adjust the reflection coefficients of the reflecting elements according to the received reflection coefficient code word and the BS may transmit a data symbol to the UE.

Figure 28:
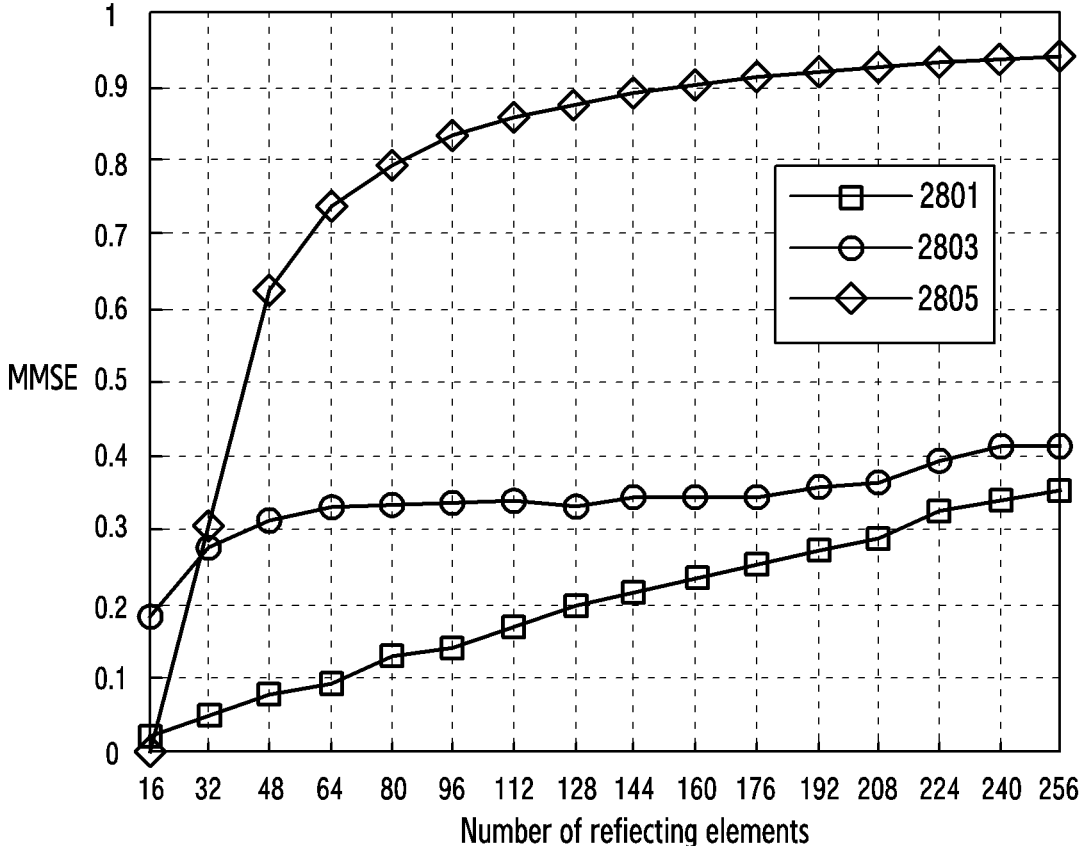
FIG. 28 is a graph illustrating channel estimation experiment data, according to an embodiment.

FIG. 28 is a graph illustrating channel estimation experiment data, according to an embodiment.

Referring to FIG. 28, a channel estimation error (i.e., a minimum mean square error (MMSE)) based on the number of IRS reflecting elements is shown to represent channel estimation performance of the disclosure. Using one of the above-described methods of the disclosure, 2801 indicates that the number of propagation paths L is 1, 2803 indicates that the number of the propagation paths L is 2, and 2805 indicates the on/off channel estimation scheme.

2801 shows channel estimation performance improvement over 50% compared to 2805, and 2803 shows performance not better than 2805, if the number of the reflecting elements is small, but noticeably lowers the increase of the channel estimation error as the number of the reflecting elements increases.

Hence, the present disclosure may decompose the channel information into a small number of multipath components, estimate them with different periods, and thus achieve accurate channel estimation with low pilot overhead in the IRS based communication with the great number of the reflecting elements.

The disclosure relates to the IRS, which is the planar meta surface including a plurality of reflecting elements, which has been suggested to, particularly, improve spectral efficiency of future wireless systems. To maximize a data rate gain of the IRS, the BS should obtain the existing direct channel between the BS and the UE as well as the channel reflected by the IRS. Since the size of the IRS reflection channel is proportional to the number of the reflecting elements, the data rate is greatly lowered due to the considerable pilot overhead and channel estimation error. In accordance with an embodiment of the disclosure, a method is provided for obtaining an IRS phase shift that maximizes the data rate of the IRS based communication system using the deep learning. To achieve this, the disclosure represents a relationship between the noisy estimation channel and the IRS phase shift using a deep neural network. Thereafter, network parameters are trained to maximize the data rate formalized with an ideal channel. This method exhibits greater performance than the conventional schemes based on simulation results shown in FIGS. 30A and 30B.

The IRS, which is a planar meta surface including a great number of reflecting elements, has drawn considerable attention for improving spectral efficiency of future wireless systems. Since each IRS reflecting element may reflect the incident signal with intended phase shift, the IRS improves the communication system capacity by modifying the radio channel in advance. In particular, in a direct link between the UE and the BS, the IRS blocked by an obstacle may improve spatial degrees of freedom (DoF) and end-to-end latency of an ultra reliable low latency communications (URLLC) application program and provide a new virtual LoS link for reducing the end-to-end latency.

Various efforts have been recently made to control the phase change of the IRS based communication system. Among them, semi-definite relaxation (SDR) based phase shift control, IRS aided terahertz MIMO system, IRS phase shift and BS beamforming optimization based on an alternating direction method of multipliers (ADMM), and phase shift control based on the deep learning have been suggested.

Conventional deep learning based phase shift control assumes that a BS is fully aware of channel state information (CSI) of the direct or IRS reflected link. However, in practice, since the size of the IRS reflected channel is proportional to the number of the reflecting elements, it is very difficult to obtain accurate CSI.

The disclosure suggests a method and an apparatus for obtaining optimal phase shift to maximize a data rate of an IRS based downlink system. The related art formulates and addresses the optimization problem using the noisy channel estimation but degrades the performance in an actual scenario.

By contrast, in accordance with an embodiment of the disclosure, the D-PSC approximates a complicated and nonlinear function between the noisy estimated channel and the intended phase shift by use of the deep learning.

Specifically, a relationship between the noisy estimated channel and the IRS phase shift is represented using a deep neural network. Network parameters are trained to maximize the formulated data rate with an ideal channel. Thus, the intended phase shift may be acquired directly from the noisy estimated channel in the test.

Figure 30A:
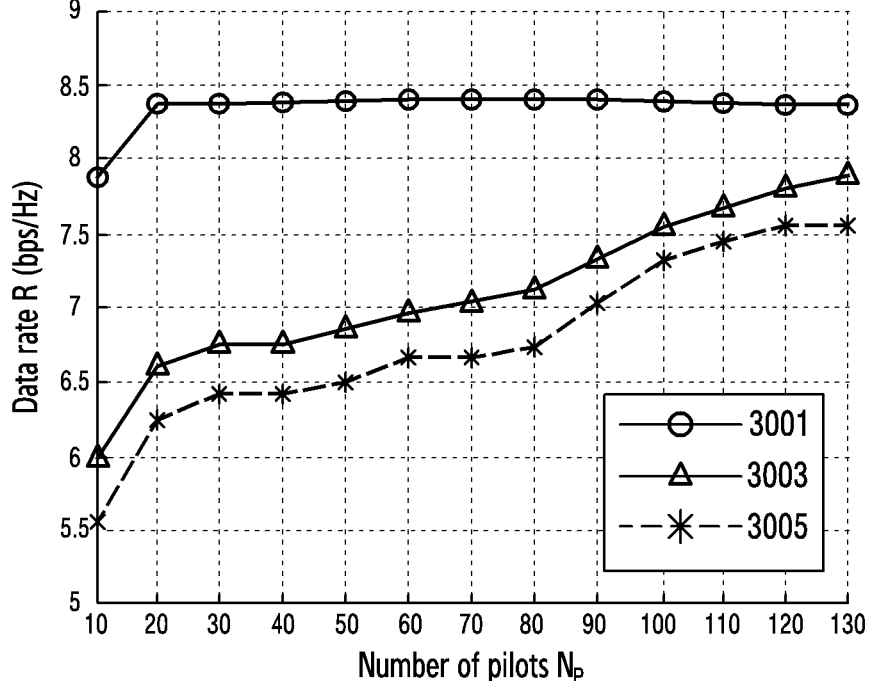
FIG. 30A is a graph illustrating data rate experiment data, according to an embodiment.
Figure 30B:
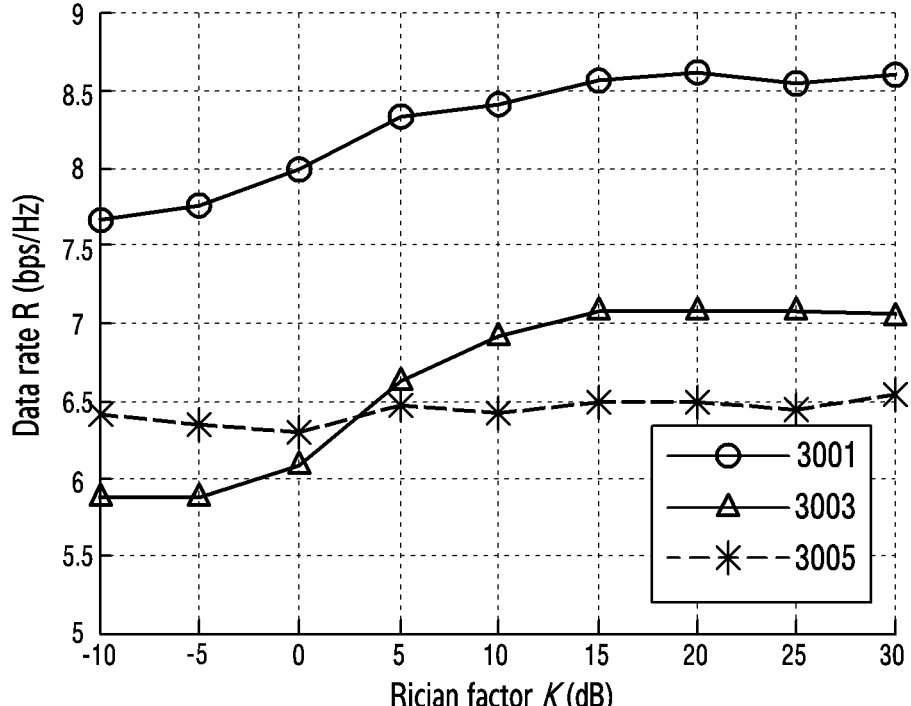
FIG. 30B is a graph illustrating data rate experiment data, according to an embodiment.

As illustrated in FIGS. 30A and 30B, the D-PSC in accordance with an embodiment of the disclosure achieves a data rate over 25% from the conventional phase shift control by using the same pilot resource.

IRS-Aided Downlink System Model

In a downlink MIMO system, a BS may transmit signals to a UE including a single antenna via M-ary antennas. Downlink communication may be performed by an IRS, which may include N-ary reflecting elements, and the N-ary reflecting elements each may reflect the incident signal with the phase shift which is independently adjustable. The IRS phase shift vector may be expressed as $\theta=[\theta_1 \ldots, \theta_N]$, where $\theta_n=e^{j\phi_n}$, $\theta_n=e^{j\phi_n}$ is a passive beamforming coefficient, and $\phi_n \in (-\pi,\pi]$ is phase shift of an n-th IRS reflecting element. The phase shift of the IRS may be configured by the BS through a dedicated control link.

An effective downlink channel may be expressed as shown in Equation (17).

$$h = Gdiag(\theta)h_r + h_d = Gdiag(h_r) + h_d = H\theta + h_d \qquad (17)$$

in Equation (17), $G \in \mathbb{C}^{M \times N}$ is the channel between the BS and the IRS, $h_r \in \mathbb{C}^N$ is the channel between the IRS and the UE, and $h_d \in \mathbb{C}^M$ is the direct channel between the BS and the UE. $H=Gdiag(\theta)h_r$ is the combined channel between the BS and the UE.

A signal $y \in \mathbb{C}$ received at the UE may be expressed by Equation (18).

$$y = h^H ws + n = (H\theta + h_d)^H ws + n \qquad (18)$$

in Equation (18), $s \in \mathbb{C}$ is the transmit signal, $w \in \mathbb{C}^M$ is a BS beamforming vector, and $$n \sim \mathcal{CN}(0, \sigma_0^2)$$

is additive white gaussian noise (AWGN) with mean 0 and variance $$\sigma_0^2.$$

Based on Equations (17) and (18), an achievable data rate R at the UE may be expressed by Equation (19).

$$R = \log_2\left(1 + \frac{\left\|(H\theta + h_d)^H w\right\|^2}{\sigma_0^2}\right) \tag{19}$$

Data Rate Maximization Problem Formulation

Data rate maximization is performed to optimize the IRS phase shift $\theta$ and the BS beamforming vector w, and may be expressed as shown in Equation (20).

$$P_1 : \max_{\theta, w} \log_2\left(1 + \frac{\left\|(H\theta + h_d)^H w\right\|^2}{\sigma_0^2}\right) \tag{20}$$

$$\text{s.t. } |\theta_n| = 1, \forall n \in \mathcal{N},$$

$$\|w\|^2 = \rho$$

In Equation (20), $\mathcal{N} = \{1, 2, \ldots, N\}$ is a set of IRS reflecting elements, and $\rho$ is a transmit power of the BS.

s.t. $|\theta_n| = 1$, $\forall n \in \mathcal{N}$ is a unit-modulus constraint of the IRS phase shift, and $\|w\|^2 = p$ is a transmit power constraint.

For the given $\theta$, the optimal BS beamforming vector may be obtained by maximum ratio transmission (MRT) beamforming $$w^* = \sqrt{\rho} \frac{H\theta + h_d}{\|H\theta + h_d\|}.$$

By applying $$w^* = \sqrt{\rho} \frac{H\theta + h_d}{\|H\theta + h_d\|}$$

to Equation (20), $P_1$ may be expressed as shown in Equation (21).

$$f_2 : \max_{\theta} \log_2\left(1 + \frac{\rho\|H\theta + h_d\|}{\sigma_0^2}\right) \tag{21}$$

$$\text{s.t. } |\theta_n| = 1, \forall n \in \mathcal{N}$$

Channel Estimation for IRS-Aided Systems

Assuming a time-division duplexing (TDD) system, the BS may obtain downlink channel information from an uplink pilot signal, based on channel reciprocity of the TDD system.

Specifically, in an i-th pilot symbol duration, the UE transmits an uplink pilot signal $$x_p^{(i)} \in \mathbb{C}$$

to the BS. A signal received at the BS may be expressed as shown in Equation (22).

$$y_p^{(i)} = H_c \theta_c^{(i)} x_p^{(i)} + n^{(i)}, i = 1, 2, \ldots, N_p \tag{22}$$

In Equation (22), $H_c = [h_d, H] \in \mathbb{C}^{M \times (N+1)}$ and $$\theta_c^{(i)} = \left[1, \theta^{(i),T}\right]^T \in \mathbb{C}^{N+1}$$

are a combined channel matrix and a phase shift vector, respectively. $N_p$ is the number of pilots, and $n^{(i)}$ is an AWAG vector.

By stacking $N_p$-ary consecutive received pilot signals, $Y_p \in \mathbb{C}^{M \times N_p}$ may be expressed as shown in Equation (23).

$$Y_p = \left[y_1^{(i)}, y_2^{(i)}, \ldots, y_{N_p}^{(i)}\right] = H_c \Theta \text{diag}(x_p) + N \tag{23}$$

In Equation (23), $$x_p = \left[x_p^{(1)}, y_p^{(2)}, \ldots, x_p^{(N_p)}\right]^T \in \mathbb{C}^{N_p}$$

is an uplink pilot sequence, $$\Theta = \left[\theta^{(1)}, \theta^{(2)}, \ldots, \theta^{(N_p)}\right] \in \mathbb{C}^{(n+1) \times N_p}$$

is a predefined phase shift matrix, and $$N = \left[n^{(1)}, n^{(2)}, \ldots, n^{(N_p)}\right] \in \mathbb{C}^{M \times N_p}$$

is an AWGN matrix.

D-PSC

To address the channel estimation error occurred by the great number of the reflecting elements, relationship between noisy estimated channels $\hat{H}$ and $\hat{h}_d$ and intended phase shift $\hat{\theta}$ is estimated, for deep learning. This is expressed by Equation (24).

$$\hat{\theta} = g(\hat{H}, \hat{h}_d; \Gamma) \tag{24}$$

In Equation (24), g is a mapping function, and $\Gamma$ is a set of D-PSC network parameters.

D-PSC Training

In this phase, the network parameters are iteratively updated to minimize a loss function J(Γ), which may be expressed as shown in Equation (25).

$$J(\Gamma) = -\log_2\left(1 + \frac{\rho\|Hg(\hat{H}, \hat{h}_d; \Gamma) + h_d\|^2}{\sigma_0^2}\right) \tag{25}$$

If the loss function J(Γ) is differentiable, the network parameters may be updated using a gradient descent method in each training iteration. A parameter set $\Gamma_j$ may be updated in the steepest descent direction at a j-th iteration, which may be expressed as shown in Equation (26).

$$\Gamma_j = \Gamma_{j-1} - \eta \nabla_\Gamma J(\Gamma) \tag{26}$$

In Equation (26), $\nabla_\Gamma J(\Gamma)$ is a gradient of J(Γ) for Γ, and η is a learning rate for determining the step size.

Supervised learning uses a large number of labeled output datasets (optimal phase shift). Yet, it is difficult to obtain considerable datasets because a nonconvex optimization problem should be addressed in order to acquire the optimal phase shift. To address this problem, the disclosure provides an unsupervised learning strategy. That is, a specific D-PSC architecture for this problem is now disclosed.

Figure 29:
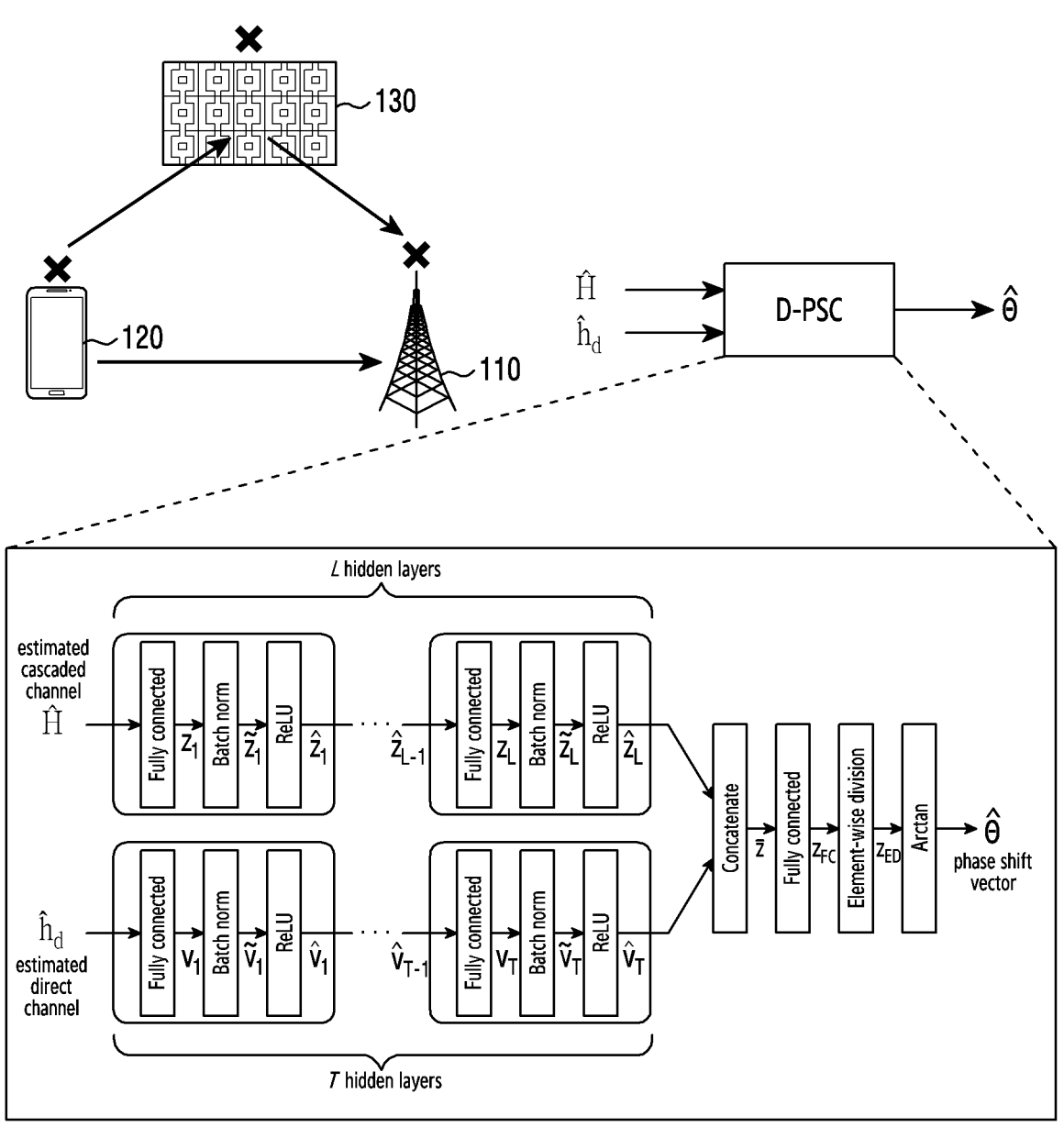
FIG. 29 illustrates D-PSC network architecture, according to an embodiment.

FIG. 29 illustrates a D-PSC network architecture, according to an embodiment.

Referring to FIG. 29, the D-PSC network includes fully connected (FC) layers, batch normalization (BN) layers, rectified linear unit (ReLU) layers, a concatenate layer, an element-wise division (ED) layer, and an arc-tangent layer. Due to different channel characteristics (e.g., AoD, AoA, path gain, etc.), the disclosure may separately apply $\hat{H}$ and $\hat{h}_d$ to the D-PSC network instead of stacking $\hat{H}$ and $\hat{h}_d$ into one vector.

For the input $\hat{H}$, $\hat{H}$ is flatted as $\hat{h}_f$, and P training data $$\hat{h}_f^{(1)} \dots \hat{h}_f^{(P)}$$

is used on each iteration.

$$\hat{h}_f^{(P)}$$

which is a complex number, uses $$\hat{h}_f^{(P)} = \left[ \mathrm{R}(\hat{h}_{f,1}^{(P)}), \dots \mathrm{R}(\hat{h}_{f,M,N}^{(p)}).\mathfrak{I}(\hat{h}_{f,1}^{(P)}), \dots \mathfrak{I}(\hat{h}_{f,M,N}^{(P)}) \right]$$

as an input vector. The training data $$\hat{h}_f^{(P)}$$

may pass a plurality of hidden layers including the FC layer, the BN layer, and the ReLU layer.

Given that an input of an l-th hidden layer is $$s_l^{(p)},$$

an output of an l-th FC layer may be expressed as shown in Equation (27).

$$z_l^{(p)} = W_l s_l^{(p)} + b_l, \forall\, p = 1, \dots, P, \forall\, l = 1, \dots, L \tag{27}$$

In Equation (27), $W_l \in \mathbb{R}^{\alpha \times \beta_l}$, $b_l \in \mathbb{R}^{\alpha}$, and $\beta_l$ are a weight, a bias, and a height of the l-th FA layer, and a is a hyper-parameter representing a width of the FC layer.

After the FC layer, P output vectors may be stacked to mini-batch $$B_l = \left[ z_l^{(1)}, \dots, z_l^{(p)} \right].$$

Next, each element $$z_{l,i}^{(p)}(i = 1, \dots, \alpha)$$

may be normalized with mean 0 and unit variance. An output $$\hat{z}_l^{(p)}$$

of the BN layer may be expressed as shown in Equation (28).

$$z_{l,i}^{(p)} = \beta\left( \frac{z_{l,i}^{(p)} - \mu_{l,i}}{\sqrt{\sigma_{l,i}^2}} \right) + \gamma, \forall\, i = 1, \dots, \alpha \tag{28}$$

In Equation (28), $$\mu_{l,i} = \frac{1}{P}\sum\nolimits_{p=1}^P z_{l,i}^{(p)} \text{ and } \sigma_{l,i}^2 = \frac{1}{P}\sum\nolimits_{p=1}^P \left(z_{l,i}^{(p)} - \mu_{l,i}\right)^2$$

are batch-wise mean and variance. β is a scaling parameter, and γ is a shifting parameter. The normalization process applies the input distribution to have the fixed mean and variance.

If the input data varies considerably, it is difficult to extract the internal characteristics (e.g., AoD, AoA, and path gain) from the input data. Hence, the variation of H may be typically significant, due to fast-changing radio geometries (i.e., location) of the UE 120. Thus, input variations by other channel states and noise levels may be handled, by using the BN layer.

At the end of the hidden layer, the ReLU layer may be applied to $$\hat{z}_l^{(p)}$$

US 12,634,712 B2

33 to determine whether information generated by the BN layer is activated (delivered to a next layer). An output $$\hat{z}_l^{(p)}$$

of the ReLU layer is $$\hat{z}_l^{(p)} = f_{ReLU}\left(\hat{z}_l^{(p)}\right),$$

and $f_{ReLU}(x)=\max(0, x)$.

For the input $\hat{h}_d$, the disclosure may use the P training data $$\hat{h}_f^{(1)} \dots \hat{h}_f^{(P)}.$$

In each iteration of the training, $$\hat{h}_d^{(p)}$$

may be fed into the plurality of the hidden layers. An output of a t-th hidden layer may be expressed as $$\hat{v}_t^{(p)} = f_{ReLU}(\hat{v}_t^{(p)}), t = 1, \dots, T.$$

After $\hat{h}_f$ and $\hat{h}_d$ pass, L and T hidden layers may concatenate two output vectors based on Equation (29).

$$\bar{z}^{(p)} = \left[\hat{z}_L^{(p)}; \hat{v}_t^{(p)}\right] \quad (29)$$

In a next step, $\bar{z}^{(p)}$ may be added to the FC layer to adjust weights of $$\hat{z}_L^{(p)} \text{ and } \hat{v}_t^{(p)}.$$

An output $$z_{FC}^{(p)} \in \mathbb{R}^{2N}$$

of the FC layer may be expressed as shown in Equation (30).

$$z_{FC}^{(p)} = W_{FC}\bar{z}^{(p)} + b_{FC} \quad (30)$$

In Equation (30), $W_{FC}$ is a weight, and $b_{FC}$ is a bias. The ED layer applied to scale $$z_{FC}^{(p)}$$

a non-saturation region of an arc-tangent function. In addition, since the gradient of the arc-tangent in the saturation region is close to zero, updating weights and biases is extremely slowed down. This phenomenon is called a gradient vanishing problem.

By applying the ED layer, the D-PSC may prevent the gradient vanishing problem. An output $$z_{ED}^{(p)}$$

of the ED layer may be expressed as shown in Equation (31).

$$z_{ED}^{(p)} = \left[\frac{z_{FC,1}^{(p)}}{z_{FC,N+1}^{(p)}}, \frac{z_{FC,2}^{(p)}}{z_{FC,N+2}^{(p)}}, \dots, \frac{z_{FC,N}^{(p)}}{z_{FC,2N}^{(p)}}\right] \quad (31)$$

By mapping the output of the arc-tangent layer to an exponential layer, the IRS phase shift vector may be acquired based on Equation (32).

$$\hat{\theta} = e^{j\delta arctan(z_{ED})}, \text{ or } \hat{\theta} = \delta arctan (z_{ED}) \quad (32)$$

In Equation (31), $\delta$ is a constant restricted to $(-\pi,\pi]$ to make the output of the D-PSC network consistent with a phase shift range.

SIMULATION RESULTS a. Simulation Setup

The disclosure provides simulation results for demonstrating effects of the proposed D-PSC. Herein, it is assumed that a distance between the BS 110 and the IRS 130 is d=25 m, and a distance between the IRS 130 and the UE 120 is r=10 m.

The simulation results set the number of antennas M of the BS 110 to 4, and the number of the IRS reflecting elements N to 32.

A path loss model may be expressed as shown in Equation (33).

$$PL = PL_0 - a\log\frac{d}{D_0} \quad (33)$$

In Equation (33), $PL_0$ is $-30$ dB, which is the path loss at a reference distance Do=1 m, d is a distance between a transmitter and a receiver, and $\alpha$ is a path loss exponent. For the channels G, $h_r$, and $h_d$, the path loss exponents may be set to $\alpha_G=2$, $\alpha_r=2.8$, and $\alpha_d=3.5$. To explain small scale fading, it is assumed that all the channels are the Rician fading channel model.

Thus, the BS-IRS channel G may be expressed as shown in Equation (34).

$$G = \sqrt{PL_G}\left(\sqrt{\frac{K}{K+1}} G^{LoS} + \sqrt{\frac{K}{K+1}} G^{NLoS}\right) \quad (34)$$

In Equation (34), K is a Rician factor, $PL_G$ is the path loss of the BS-IRS channel G, $G^{NLoS}$ is a non-LoS (NLos) component generated from independent and identically distribution (i.i.d) circularly symmetric complex Gaussian (CSCG) random process, and $G^{LoS}$ is a deterministic LoS component. The channels $h_r$ and $h_d$ are similarly generated. The antenna gains at the BS 110, the UE 120, and the IRS 130 are set to 0 dBi, 0 dBi, and 5 dBi, respectively. For the configuration of the D-PSC network, the disclosure sets the learning rate to 0.001, the batch size to 200, and the number of samples to $2 \times 10^5$. The hidden layers L and T are set to 4 and 2 respectively.

b. Simulation Results

FIGS. 30A and 30B are graphs illustrating data rate experiment data, according to an embodiment.

Referring to FIG. 30A, which shows the number of pilots and the data rate R, if K=10 dB, a D-PSC in accordance with an embodiment of the disclosure achieves a higher data rate R 3001 than 3003 and 3005. For example, if Np=60, the D-PSC achieves 30% and 20% higher data rate R 3001 than a conventional scheme 3003 and the SDR based scheme 3005 not including the IRS. Even if a small number of pilots are used, the D-PSC achieves a higher data rate R. For example, compared to a conventional scheme not including the IRS, the D-PSC in accordance with an embodiment of the disclosure may increase the data rate of 43% at Np=10. Also, if the number of the pilots is Np=20, the D-PSC may achieve data rate improvement 25% over the SDR based scheme 3003. Hence, the disclosure may reduce the channel estimation error from the input data even if the small number of pilots are used.

Referring to FIG. 30B, which shows a graph of the data rate of the suggested D-PSC versus the Rician factor, if Np=50, the D-PSC in accordance with an embodiment of the disclosure achieves a higher data rate for every K. For example, if K=10 dB, the D-PSC 3001 increases the data rate of 20% in the SDR 3003, and increases the data rate of 30% in the conventional scheme 3005 not including the IRS. In addition, if K is greater than –5 dB, the data rate 3001 of the D-PSC and the SDR based scheme 3003 increase the data rate as the Rician factor increases. If K is between –5 dB and 15 dB, the D-PSC in accordance with an embodiment of the disclosure may improve the data rate over 13%. Accordingly, the higher Rician factor K results in higher correlation among the channel G between the BS 110 and the UE 120.

As described above, the IRS phase shift control technique based on the deep learning may be used to increase the data rate in the IRS based system. The suggested D-PSC learns the complicated nonlinear mapping between the noisy estimated channel and the IRS phase shift through the unsupervised training process.

By training the network parameters using the unsupervised learning strategy and generating the loss function based on the ideal channel information, the optimal phase shifts for maximizing the data rate may be obtained. From the simulation results of FIGS. 30A and 30B, the disclosure may achieve the data rate 25% over the conventional phase shift control scheme 3005 with the same number of the pilots.

According to various embodiments, an operating method of a BS in a wireless communication system includes broadcasting a power signal of an IRS; broadcasting an SSB; and requesting receive beam reporting from a control unit of the IRS.

The operating method further includes transmitting an IRS control code word for initial access to the IRS.

The operating method further includes obtaining an AoD between the BS and the IRS based on the SSB beam index information.

The operating method further includes obtaining an AoA between the BS and the IRS based on the receive beam index information.

The operating method further includes, if the BS and the IRS are directly connected, directly receiving location information from the IRS; and obtaining an AoD θ and an AoA φ between the BS and the IRS based on the location information.

The operating method further includes transmitting first DCI to a user equipment; transmitting an IRS reflecting element OFF mode switch signal to the IRS; receiving a first SRS indicated by the first DCI; estimating a direct channel between the BS and the user equipment based on the first SRS; transmitting second DCI and a beam tracking control signal for IRS channel estimation to the user equipment; receiving a second SRS indicated by the second DCI; and estimating angle information between the IRS and the user equipment based on the second SRS.

The operating method further includes estimating a combined channel based on the second SRS; transmitting a beam control signal for data communication to the IRS; and transmitting downlink data to the user equipment.

According to various embodiments, an operating method of an IRS in a wireless communication system includes turning on every reflecting element of the IRS in response to a power signal of the IRS received from a BS; obtaining cell information and performing synchronization in response to an SSB received from the BS; transmitting an SSB beam index to the BS; and transmitting a receive beam index to the BS in response to a receive beam reporting request from the BS.

The operating method further includes receiving an initial access request signal from a user equipment; notifying the BS that the initial access request signal is received from the user equipment; and reflecting a BS SSB beam to the user equipment based on an IRS control code word received from the BS.

The operating method further includes receiving a reflecting element OFF mode switch signal from the BS; receiving a reflecting element ON mode switch signal and a beam tracking control signal for IRS channel estimation from the BS; and adjusting a reflection coefficient of the IRS based on the beam tracking control signal for the IRS channel estimation.

The operating method further includes turning off the reflecting element in response to receiving the reflecting element OFF mode switch signal; turning on the reflecting element in response to receiving the reflecting element ON mode switch signal; receiving a beam control request signal for data communication based on adjusting the reflection coefficient; and adjusting the reflection coefficient based on the beam control request signal for the data communication.

According to various embodiments, an operating method of a UE in a wireless communication system includes, if not receiving an SSB from a BS, transmitting an initial access request signal to an IRS; obtaining cell information and performing synchronization based on a BS SSB beam reflected by the IRS; and transmitting an SSB beam index to the BS.

The operating method further includes, if receiving an SSB from the BS, performing initial access by directly receiving the SSB from the BS.

The operating method further includes receiving first DCI from the BS; transmitting a first SRS for direction channel estimation between the BS and the user equipment indicated by the first DCI; receiving second DCI from the BS; and transmitting a second SRS for combined channel estimation between the BS and the user equipment indicated by the second DCI.

The operating method further includes receiving downlink data from the BS.

According to various embodiments, a BS includes a communication unit; and a processor operatively connected with the communication unit, wherein the processor is configured to, broadcast a power signal of an IRS, broadcast an SSB, and request receive beam reporting from a control unit of the IRS.

The processor is further configured to transmit an IRS control code word for initial access to the IRS.

The processor is further configured to obtain an AoD between the BS and the IRS based on SSB beam index information.

The processor is further configured to obtain an AoA between the BS and the IRS based on receive beam index information.

The processor is further configured to, if the BS and the IRS are directly connected, directly receive location information from the IRS, and obtain an AoD θ and an AoA φ between the BS and the IRS based on the location information.

As described above, an apparatus and a method according to embodiments of the disclosure may decompose channel information into a small number of multipath components, estimate them with different periods, and thus perform accurate channel estimation with low pilot overhead in an IRS based communication having a great number of reflecting elements.

In addition, the IRS may be effectively controlled by adopting an IRS power control signal for IRS control, beam control request signal for channel estimation, and beam control request signal for data communication in initial access, channel estimation, and data communication of the IRS.

In addition, the data rate may be maximized based on the D-PSC architecture.

Effects obtainable from the disclosure are not limited to the above-mentioned effects, and other effects which are not mentioned may be clearly understood by those skilled in the art of the disclosure through the following descriptions.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs), or other optical storage devices, and a magnetic cassette. Alternatively, it may be stored to a memory combining some or all of those recording media. A plurality of memories may be included.

The program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the above-described embodiments of the disclosure, the elements included in the disclosure may be expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a base station (BS) in a wireless communication system, the method comprising:
broadcasting a power signal of an intelligent reflecting surface (IRS);
broadcasting a synchronization signal block (SSB);
transmitting, to a control unit of the IRS, a request for reporting a receive beam;
transmitting, to the IRS, an IRS reflecting element OFF mode switch signal;
receiving, from the user equipment (UE), a first sounding reference signal (SRS);
estimating a direct channel between the BS and the UE based on the first SRS;
transmitting, to the IRS, an IRS reflecting element ON mode switch signal;
transmitting, to the IRS, a beam tracking control signal for estimating an IRS channel;
receiving, from the UE, a second SRS; and
estimating angle information between the IRS and the UE based on the second SRS.

2. The method of claim 1, further comprising transmitting an IRS control code word for initial access to the IRS.

3. The method of claim 1, further comprising obtaining an angle of departure (AoD) between the BS and the IRS based on beam index information of the SSB.

4. The method of claim 1, further comprising obtaining an angle of arrival (AoA) between the BS and the IRS based on index information of the receive beam.

5. The method of claim 1, further comprising:
if the BS and the IRS are directly connected, directly receiving location information from the IRS; and
obtaining an angle of departure (AoD) θ and an angle of arrival (AoA) φ between the BS and the IRS based on the location information.

6. The method of claim 1, further comprising:
estimating a combined channel based on the second SRS;
transmitting, to the IRS, a beam control signal for data communication; and
transmitting, to the UE, downlink data.

7. A base station (BS), comprising:
at least one transceiver;
at least one processor communicatively coupled to the at least one transceiver; and at least one memory, communicatively coupled to the at least one processor, storing instructions executable by the at least one processor individually or in any combination to cause the base station to:

broadcast a power signal of an intelligent reflecting surface (IRS), broadcast a synchronization signal block (SSB), transmit, to a control unit of the IRS, a request for reporting a receive beam, transmit, to the IRS, an IRS reflecting element OFF mode switch signal, receive, from the user equipment (UE), a first sounding reference signal (SRS), estimate a direct channel between the BS and the UE based on the first SRS, transmit, to the IRS, an IRS reflecting element ON mode switch signal, transmit, to the IRS, a beam tracking control signal for estimating an IRS channel, receive, from the UE, a second SRS, and estimate angle information between the IRS and the UE based on the second SRS.

8. The BS of claim 7, wherein the instructions further cause the BS to transmit an IRS control code word for initial access to the IRS.

9. The BS of claim 8, wherein the instructions further cause the BS to obtain an angle of departure (AoD) between the BS and the IRS based on beam index information of the SSB.

10. The BS of claim 8, wherein the instructions further cause the BS to obtain an angle of arrival (AoA) between the BS and the IRS based on index information of the receive beam.

11. The BS of claim 8, wherein the instructions further cause the BS to:

if the BS and the IRS are directly connected, directly receive location information from the IRS, and obtain an angle of departure (AoD) $\theta$ and an angle of arrival (AoA) $\varphi$ between the BS and the IRS based on the location information.

12. The BS of claim 8, wherein the instructions further cause the BS to:

estimate a combined channel based on the second SRS, transmit, to the IRS, a beam control signal for data communication, and transmit, to the UE, downlink data.

* * * * *